US011921191B2

(12) United States Patent
Akiyama et al.

(10) Patent No.: US 11,921,191 B2
(45) Date of Patent: Mar. 5, 2024

(54) OBJECT RECOGNITION DEVICE AND OBJECT RECOGNITION METHOD

(71) Applicants: Mitsubishi Electric Corporation, Tokyo (JP); Mazda Motor Corporation, Hiroshima (JP)

(72) Inventors: Tomohiro Akiyama, Tokyo (JP); Takayuki Moritani, Hiroshima (JP)

(73) Assignees: Mitsubishi Electric Corporation, Tokyo (JP); MAZDA MOTOR CORPORATION, Hiroshima (JP)

( * ) Notice: Subject to any disclaimer, the term of this patent is extended or adjusted under 35 U.S.C. 154(b) by 548 days.

(21) Appl. No.: 17/202,975

(22) Filed: Mar. 16, 2021

(65) Prior Publication Data
US 2021/0312196 A1    Oct. 7, 2021

(30) Foreign Application Priority Data
Apr. 2, 2020   (JP) .................................. 2020-066624

(51) Int. Cl.
  *G01S 13/86*    (2006.01)
  *B60W 40/12*    (2012.01)
  *G06V 20/58*    (2022.01)
(52) U.S. Cl.
  CPC .......... *G01S 13/862* (2013.01); *B60W 40/12* (2013.01); *G06V 20/58* (2022.01); *B60W 2520/105* (2013.01); *B60W 2520/12* (2013.01); *B60W 2554/4043* (2020.02); *B60W 2554/4049* (2020.02)

(58) Field of Classification Search
  CPC ...... G01S 13/862; G06V 20/58; B60W 40/12; B60W 2554/4043; B60W 2554/4049; B60W 2520/105; B60W 2520/12
  See application file for complete search history.

(56) References Cited

FOREIGN PATENT DOCUMENTS

| JP | 2017-075881 A | 4/2017 |
| WO | 2019172103 A1 | 9/2019 |
| WO | 2019230055 A1 | 12/2019 |

OTHER PUBLICATIONS

Extended European Search Report dated Aug. 27, 2021 in application No. 21162813.6.

*Primary Examiner* — Peter D Nolan
*Assistant Examiner* — Mikko Okechukwu Obioha
(74) *Attorney, Agent, or Firm* — Sughrue Mion, PLLC; Richard C. Turner

(57) ABSTRACT

The object recognition device includes at least one sensor, a data reception unit, and a setting unit. The sensor detects an object present in a detectable range and transmits object data including a plurality of physical quantities indicating a state of the object. The data reception unit receives the object data from the sensor. The setting unit generates prediction data which predicts current object data based on at least a part of past object data received by the data reception unit and a motion model in the object, and sets a association possible region for determining a association between the prediction data and the current object data based on a plurality of physical-quantity delay times each corresponding to each of the plurality of physical quantities included in the prediction data.

11 Claims, 13 Drawing Sheets

OBJECT RECOGNITION DEVICE AND OBJECT RECOGNITION METHOD

BACKGROUND OF THE INVENTION

1. Field of the Invention

The present invention relates to an object recognition device and an object recognition method.

2. Description of the Related Art

A related-art object recognition device (for example, see Japanese Patent Application Laid-open No. 2017-75881) includes a processing unit configured to receive object data including a detection value of a physical quantity indicating a state of each object from each of a plurality of sensors installed on an ego vehicle and process the received object data, to thereby recognize the objects existing in the surroundings of the ego vehicle.

A plurality of sensor delay times each corresponding to each of the plurality of sensors are set to the object recognition device. The sensor delay time indicates a period of time considered to exist from the detection of the object by the sensor to the reception of the object data from the sensor by the processing unit.

The processing unit is configured to subtract the sensor delay time corresponding to the sensor from the reception time at which the object data is received from the sensor, to thereby calculate an object detection time, which is a time at which the sensor detected the object. Moreover, the processing unit is configured to associate the object data received from the sensor with the calculated object detection time.

Consideration is now given of a case in which, in the object recognition device, the processing unit is configured to generate prediction data including a prediction value of the physical quantity at the object detection time associated with the object data and to determine a association between the generated prediction data and the object data. In this case, a large error at such a degree as to influence the determination of the association is liable to occur between the prediction value of the physical quantity included in the prediction data corresponding to the object detection time and the detection value of the physical quantity included in the object data corresponding to the object detection time. As a specific example, consideration is given of a case in which the sensor is a camera, and the physical quantities are a longitudinal position and a longitudinal speed.

In the above-mentioned case, when the camera detects an object and calculates both of a detection value of the longitudinal position of the object and a detection value of the longitudinal speed of the object, the camera executes pieces of smoothing processing different from each other for the respective detection values. As a result, the above-mentioned error is liable to occur between the prediction value and the detection value in at least one physical quantity of the longitudinal position and the longitudinal speed. In this case, the association determined by the object recognition device is incorrect, and consequently, precision of the recognition of the object by the object recognition device is liable to deteriorate.

SUMMARY OF THE INVENTION

The present invention has been made to solve the above-mentioned problem, and has an object to provide an object recognition device and an object recognition method which are capable of suppressing deterioration of precision of recognition of an object.

According to at least one embodiment of the present invention, there is provided an object recognition device including: at least one sensor configured to detect an object present in a detectable range and to transmit object data including a plurality of physical quantities indicating a state of the object; a data reception unit configured to receive the object data from the at least one sensor; and a setting unit configured to generate prediction data which predicts current object data based on at least a part of past object data received by the data reception unit and a motion model in the object and to set a association possible region for determining a association between the prediction data and the current object data based on the prediction data and a plurality of physical-quantity delay times each corresponding to each of the plurality of physical quantities.

According to at least one embodiment of the present invention, it is possible to provide the object recognition device and the object recognition method which are capable of suppressing the deterioration of the precision of the recognition of the object.

DESCRIPTION OF THE EMBODIMENTS

Now, an object recognition device and an object recognition method according to preferred embodiments of the present invention are described with reference to the accompanying drawings. In the illustration of the drawings, the same components or corresponding components are denoted by the same reference symbols, and an overlapping description thereof is herein omitted.

First Embodiment

Figure 1:
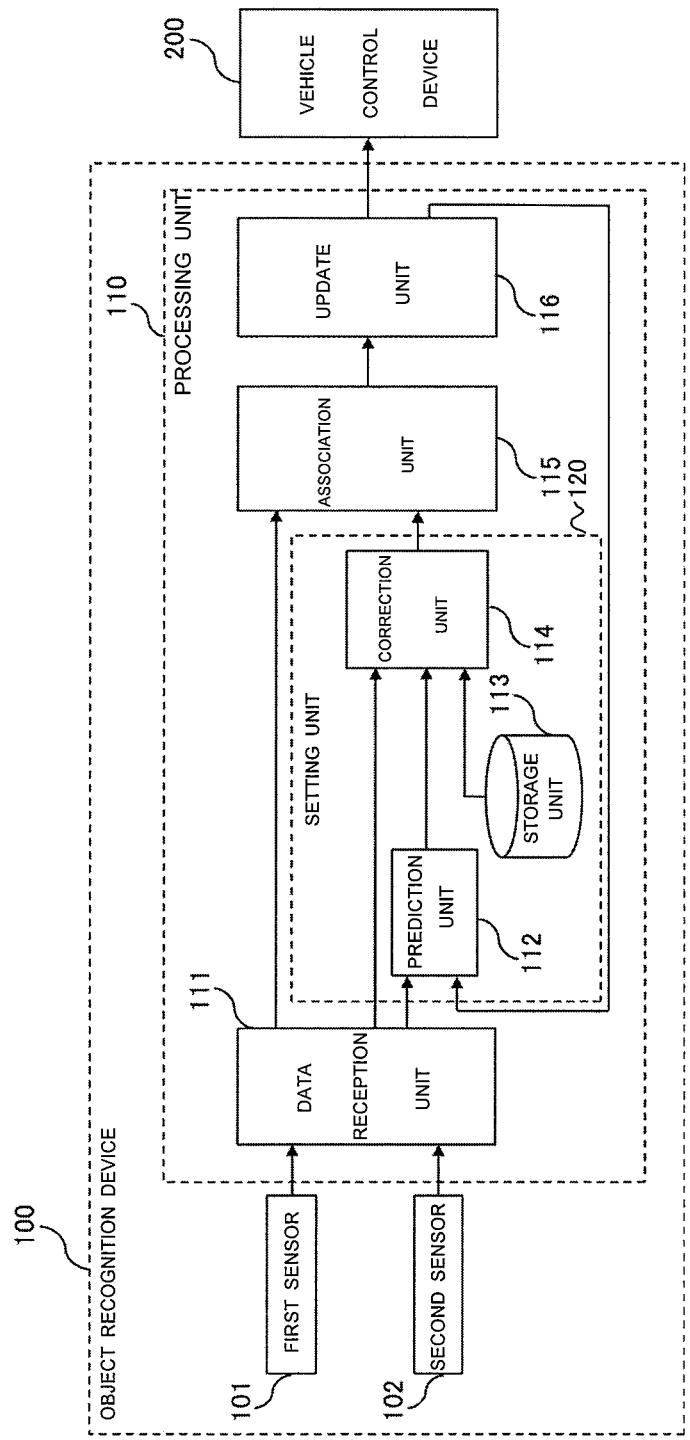
FIG. 1 is a block diagram for illustrating a configuration of a vehicle control system including an object recognition device according to a first embodiment of the present invention.

FIG. 1 is a block diagram for illustrating a configuration of a vehicle control system including an object recognition device 100 according to a first embodiment of the present invention. In FIG. 1, the vehicle control system is provided in an ego vehicle, and includes the object recognition device 100 and a vehicle control device 200.

The object recognition device 100 includes a first sensor 101, a second sensor 102, and a processing unit 110. In the first embodiment, there is exemplified the case in which the number of sensors is two, but the number of the sensors may be one, or three or more. That is, the number of sensors is required to be at least one or more.

Each of the first sensor 101 and the second sensor 102 detects an object present in a detectable range in the surroundings of the ego vehicle, and transmits, to the processing unit 110, object data D including a plurality of physical quantities indicating states of the object.

As an example, each of the first sensor 101 and the second sensor 102 receives a detection wave, such as light or an electromagnetic wave, radiated from the object, and applies required processing such as signal processing or image processing to the received detection wave, to thereby calculate the plurality of physical quantities. As another example, each of the first sensor 101 and the second sensor 102 irradiates the object with a detection wave, receives the detection wave reflected from the object, and applies required processing such as signal processing or image processing to the received detection wave, to thereby calculate the plurality of physical quantities.

More specifically, as each of the first sensor 101 and the second sensor 102, a radar, an ultrasonic sensor, an infrared sensor, an optical camera, an intervehicle communication device, or the like can be used. The first sensor 101 and the second sensor 102 may be of types different from each other, or may be of the same type.

The plurality of physical quantities at least include two physical quantities being a longitudinal position of the object and a longitudinal speed of the object. In the first embodiment, as a specific example, there is exemplified a case in which the plurality of physical quantities at least include two physical quantities being a relative longitudinal position px of the object with respect to the ego vehicle and a relative longitudinal speed vx of the object with respect to the ego vehicle.

When the number of objects present in a detection range is one, each of the first sensor 101 and the second sensor 102 transmits, to the processing unit 110, one piece of object data D corresponding to the one object. Moreover, when the number of objects present in a detection range is two or more, each of the first sensor 101 and the second sensor 102 transmits, to the processing unit 110, a plurality of pieces of object data D each corresponding to each of the plurality of objects.

The object data D transmitted by the first sensor 101 is hereinafter referred to as "object data D1" as required. Similarly, the object data D transmitted by the second sensor 102 is referred to as "object data D2."

The processing unit 110 includes a data reception unit 111, a prediction unit 112, a storage unit 113, a correction unit 114, a association unit 115, and an update unit 116.

The data reception unit 111 receives the object data D from each of the first sensor 101 and the second sensor 102. The longitudinal position px included in the object data D is hereinafter referred to as "longitudinal position detection value Dpx" as required. Similarly, the longitudinal speed vx included in the object data D is hereinafter referred to as "longitudinal speed detection value Dvx."

Two sensor delay time set values corresponding to the first sensor 101 and the second sensor 102, respectively, are set to the data reception unit 111. The two sensor delay time set values are fixed values determined in advance. The sensor delay time set value corresponding to the first sensor 101 is hereinafter referred to as "sensor delay time set value Td_set1" as required. Similarly, the sensor delay time set value corresponding to the second sensor 102 is hereinafter referred to as "sensor delay time set value Td_set2."

When the data reception unit 111 receives the object data D from any one of the first sensor 101 and the second sensor 102, the data reception unit 111 subtracts the sensor delay time set value corresponding to the sensor being the transmission source of the object data D from a reception time at which the object data D was received, to thereby determine an object detection time. Moreover, the data reception unit 111 associates the received object data D with the determined object detection time.

Description is now given of the sensor delay time set value while the first sensor 101 is exemplified. There exists a delay time from the detection of the object by the first sensor 101 to the reception of the object data D1 on the object from the first sensor 101 by the data reception unit 111. The same applies to the second sensor 102.

Thus, the sensor delay time set value Td_set1 is set to the data reception unit 111 as the delay time corresponding to the first sensor 101. When the data reception unit 111 receives the object data D1 from the first sensor 101, the data reception unit 111 subtracts the sensor delay time set value Td_set1 from the reception time at which the object data D1 was received, to thereby determine the object detection time. The data reception unit 111 associates the object data D1 with the object detection time determined as described above, and outputs the associated object data D1 to the prediction unit 112, the correction unit 114, and the association unit 115.

Moreover, the sensor delay time set value Td_set2 is set to the data reception unit 111 as the delay time corresponding to the second sensor 102. When the data reception unit 111 receives the object data D2 from the second sensor 102, the data reception unit 111 subtracts the sensor delay time set value Td_set2 from the reception time at which the object data D2 was received, to thereby determine the object detection time. The data reception unit 111 associates the object data D2 with the object detection time determined as described above, and outputs the associated object data D2 to the prediction unit 112, the correction unit 114, and the association unit 115.

The prediction unit 112 uses track data F corresponding to a last object detection time earlier than the object detection time associated with the object data D received by the data reception unit 111 to generate prediction data P being a prediction result of the track data F corresponding to the object detection time.

Specifically, the prediction unit 112 performs time transition on the track data F corresponding to the last object detection time in accordance with a motion model determined in advance, to thereby predict the track data F corresponding to the current object detection time, and outputs the prediction result as the prediction data P. The longitudinal position px included in the prediction data P is hereinafter referred to as "longitudinal position prediction value Ppx" as required. Similarly, the longitudinal speed vx included in the prediction data P is hereinafter referred to as "longitudinal speed prediction value Pvx."

The prediction unit 112 generates a association possible region Sp corresponding to the longitudinal position px based on the longitudinal position prediction value Ppx included in the generated prediction data P. Specifically, the prediction unit 112 generates the association possible region Sp being a region centered around the longitudinal position prediction value Ppx included in the generated prediction data P. The prediction unit 112 outputs the generated prediction data P and association possible region Sp to the correction unit 114.

Figure 2:
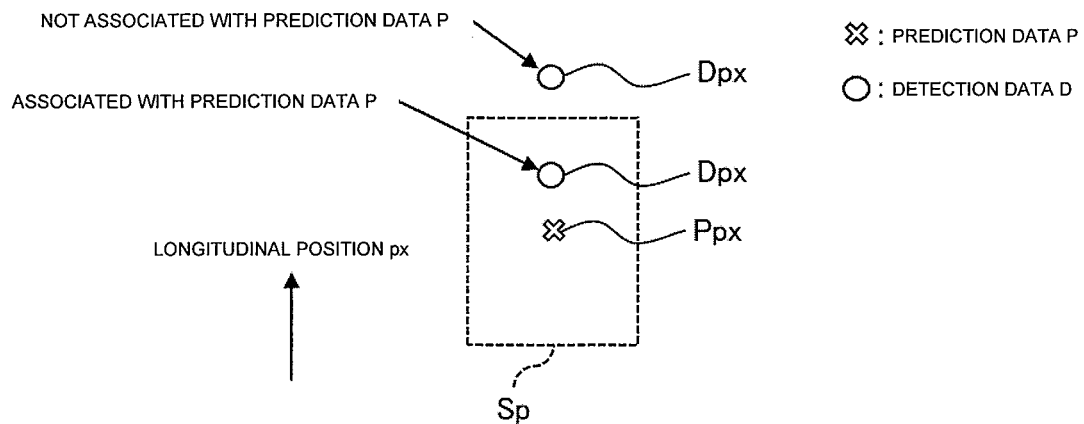
FIG. 2 is an explanatory diagram for illustrating an example of a association possible region generated by a prediction unit in the first embodiment.

With reference to FIG. 2, description is now given of an example of the association possible region Sp generated by the prediction unit 112. FIG. 2 is an explanatory diagram for illustrating the example of the association possible region Sp generated by the prediction unit 112 in the first embodiment.

As illustrated in FIG. 2, the association possible region Sp is the region centered around the longitudinal position prediction value Ppx included in the prediction data P. A shape and a size of the association possible region Sp are determined in advance, and the association possible region Sp is thus uniquely determined based on the longitudinal position prediction value Ppx.

The association possible region Sp is a region for determining a association between the prediction data P and the object data D. That is, when the longitudinal position detection value Dpx included in the object data D is present in the association possible region Sp, it is considered that the prediction data P and the object data D associate with each other. Meanwhile, when the longitudinal position detection value Dpx included in the object data D is present outside the association possible region Sp, it is considered that the prediction data P and the object data D do not associate with each other.

The two sensor delay time set values corresponding to the first sensor 101 and the second sensor 102, respectively, that is, the sensor delay time set value Td_set1 and the sensor delay time set value Td_set2, are stored in the storage unit 113. Two physical-quantity delay time groups corresponding to the first sensor 101 and the second sensor 102, respectively, are further stored in the storage unit 113.

Each of the two physical-quantity delay time groups includes two physical-quantity delay times corresponding to the longitudinal position px and the longitudinal speed vx, respectively. The two physical-quantity delay times included in each of the two physical-quantity delay time groups are fixed values determined in advance.

Specifically, the physical-quantity delay time group corresponding to the first sensor 101 includes a longitudinal position delay time Td_px1 corresponding to the longitudinal position px and a longitudinal speed delay time Td_vx1 corresponding to the longitudinal speed vx. The longitudinal position delay time Td_px1 and the longitudinal speed delay time Td_vx1 are fixed values determined in advance.

The physical-quantity delay time group corresponding to the second sensor 102 includes a longitudinal position delay time Td_px2 corresponding to the longitudinal position px and a longitudinal speed delay time Td_vx2 corresponding to the longitudinal speed vx. The longitudinal position delay time Td_px2 and the longitudinal speed delay time Td_vx2 are fixed values determined in advance.

The physical-quantity delay time group corresponding to the first sensor 101 is hereinafter referred to as "physical-quantity delay time group Td_ph1" as required. Similarly, the physical-quantity delay time group corresponding to the second sensor 102 is hereinafter referred to as "physical-quantity delay time group Td_ph2."

Description is now given of the physical-quantity delay time group while the first sensor 101 is exemplified. An error may occur between the longitudinal position detection value Dpx included in the object data D1 associated with the object detection time and the longitudinal position prediction value Ppx included in the prediction data P corresponding to the object detection time. The same applies to the longitudinal speed detection value Dvx included in the object data D1 and the longitudinal speed prediction value Pvx included in the prediction data P. In this case, the sensor delay time set value Td_set1 used by the data reception unit 111 to determine the object detection time may not be appropriate. Thus, in the first embodiment, the parameters referred to as "physical-quantity delay time group Td_ph1" are employed for the first sensor 101.

That is, the longitudinal position delay time Td_px1 included in the physical-quantity delay time group Td_ph1 is a parameter for compensating for the error occurring between the longitudinal position detection value Dpx and the longitudinal position prediction value Ppx. The longitudinal speed delay time Td_vx1 included in the physical-quantity delay time group Td_ph1 is a parameter for compensating for the error occurring between the longitudinal speed detection value Dvx and the longitudinal speed prediction value Pvx.

Similarly, the parameters referred to as "physical-quantity delay time group Td_ph2" are employed for the second sensor 102.

The correction unit 114 corrects, based on the sensor delay time set values Td_set1 and Td_set2 and the physical-quantity delay time groups Td_ph1 and Td_ph2, the association possible region Sp generated by the prediction unit 112, to thereby generate a corrected association possible region Sp_mod corresponding to the longitudinal position px. The correction unit 114 outputs the generated corrected association possible region Sp_mod to the association unit 115.

Figure 3:
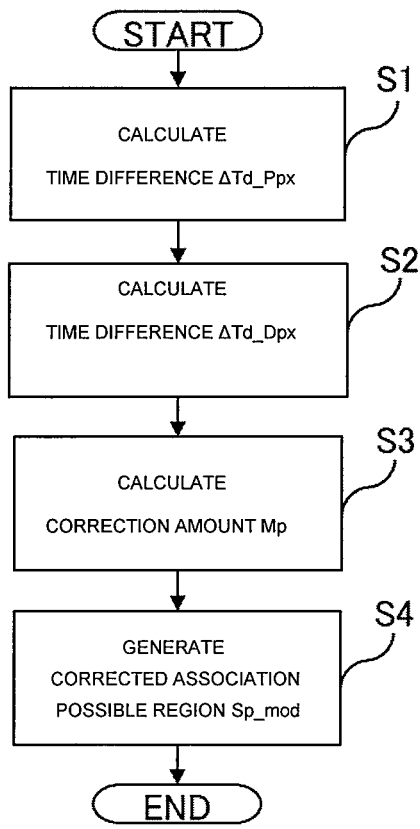
FIG. 3 is a flowchart for illustrating a series of processing procedures for generating, by a correction unit, a corrected association possible region in the first embodiment.

With reference to FIG. 3, description is now given of processing for generating the corrected association possible region Sp_mod by the correction unit 114. FIG. 3 is a flowchart for illustrating a series of processing procedures for generating, by the correction unit 114, the corrected association possible region Sp_mod in the first embodiment. The last object detection time before the object detection time associated with the object data D received by the data reception unit 111 is hereinafter referred to as "last object detection time."

In Step S1, in the manner described below, the correction unit 114 calculates a time difference ΔTd_Ppx corresponding to the prediction data P generated by the prediction unit 112 based on the sensor delay time set values Td_set1 and Td_set2 and the physical-quantity delay time groups Td_ph1 and Td_ph2.

That is, the correction unit 114 identifies the sensor being the transmission source of the object data D associated with the last object detection time. When the identified sensor is the first sensor 101, the correction unit 114 uses the sensor delay time set value Td_set1 and the longitudinal position delay time Td_px1 to calculate the time difference ΔTd_Ppx in accordance with Expression (1-1).

$$\Delta Td\_Ppx = Td\_set1 - Td\_px1 \qquad (1\text{-}1)$$

Meanwhile, when the identified sensor is the second sensor 102, the correction unit 114 uses the sensor delay time set value Td_set2 and the longitudinal position delay time Td_px2 to calculate the time difference ΔTd_Ppx in accordance with Expression (1-2).

$$\Delta Td\_Ppx = Td\_set2 - Td\_px2 \qquad (1\text{-}2)$$

After that, in Step S2, in the manner described below, the correction unit 114 calculates a time difference ΔTd_Dpx corresponding to the object data D received by the data reception unit 111 based on the sensor delay time set values Td_set1 and Td_set2 and the physical-quantity delay time groups Td_ph1 and Td_ph2.

That is, the correction unit 114 identifies the sensor being the transmission source of the object data D received by the data reception unit 111. When the identified sensor is the first sensor 101, the correction unit 114 uses the sensor delay time set value Td_set1 and the longitudinal position delay time Td_px1 to calculate the time difference ΔTd_Dpx in accordance with Expression (1-3).

$$\Delta Td\_Dpx = Td\_set1 - Td\_px1 \qquad (1\text{-}3)$$

Meanwhile, when the identified sensor is the second sensor 102, the correction unit 114 uses the sensor delay time set value Td_set2 and the longitudinal position delay time Td_px2 to calculate the time difference ΔTd_Dpx in accordance with Expression (1-4).

$$\Delta Td\_Dpx = Td\_set2 - Td\_px2 \qquad (1\text{-}4)$$

After that, in Step S3, the correction unit 114 uses the time difference ΔTd_Ppx calculated in Step S1, the time difference ΔTd_Dpx calculated in Step S2, and the longitudinal speed prediction value Pvx included in the prediction data P generated by the prediction unit 112 to calculate a correction amount Mp for correcting the association possible region Sp in accordance with Expression (1-5).

$$Mp = Pvx \times (\Delta Td\_Ppx - \Delta Td\_Dpx) \qquad (1\text{-}5)$$

After that, in Step S4, the correction unit 114 uses the correction amount Mp calculated in Step S3 to correct the association possible region Sp generated by the prediction unit 112, to thereby generate the corrected association possible region Sp_mod.

Figure 4:
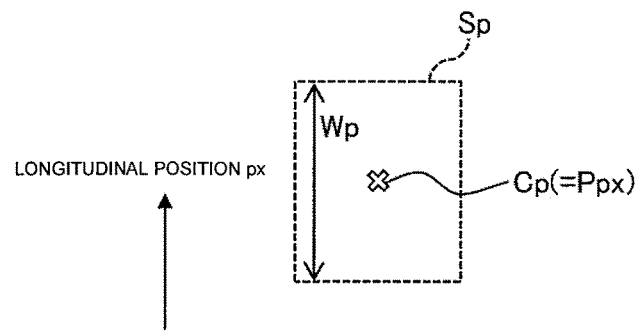
FIG. 4 is an explanatory diagram for illustrating an example of the association possible region obtained from the prediction unit by the correction unit in the first embodiment.
Figure 5:
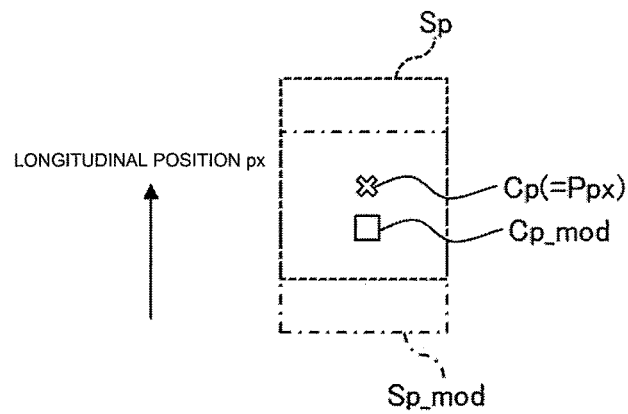
FIG. 5 is an explanatory diagram for illustrating a first example of the corrected association possible region generated by the correction unit in the first embodiment.

With reference to FIG. 4 and FIG. 5, description is now given of a first example in which the correction unit 114 uses the correction amount Mp to generate the corrected association possible region Sp_mod. FIG. 4 is an explanatory diagram for illustrating an example of the association possible region Sp obtained from the prediction unit 112 by the correction unit 114 in the first embodiment. FIG. 5 is an explanatory diagram for illustrating the first example of the corrected association possible region Sp_mod generated by the correction unit 114 in the first embodiment.

As described above, the association possible region Sp illustrated in FIG. 4 is the region having, as the center point, the longitudinal position prediction value Ppx included in the prediction data P. The center point of the association possible region Sp is hereinafter referred to as "center point Cp." A longitudinal width of the association possible region Sp is hereinafter referred to as "longitudinal width Wp."

As the first example, the correction unit 114 corrects the center point Cp of the association possible region Sp illustrated in FIG. 4, to thereby generate the corrected association possible region Sp_mod illustrated in FIG. 5. That is, the correction unit 114 uses the correction amount Mp to calculate a corrected center point Cp_mod being a center point of the corrected association possible region Sp_mod in accordance with Expression (1-6).

$$Cp\_\text{mod} = Cp + Mp \qquad (1\text{-}6)$$

In the first example, it is assumed that a corrected longitudinal width Wp_mod being a longitudinal width of the corrected association possible region Sp_mod and the longitudinal width Wp of the association possible region Sp are the same.

The correction unit 114 generates, as the corrected association possible region Sp_mod, the region having the calculated corrected center point Cp_mod as the center point. As described above, the correction unit 114 uses the correction amount Mp to correct the association possible region Sp, to thereby generate the corrected association possible region Sp_mod.

Figure 6:
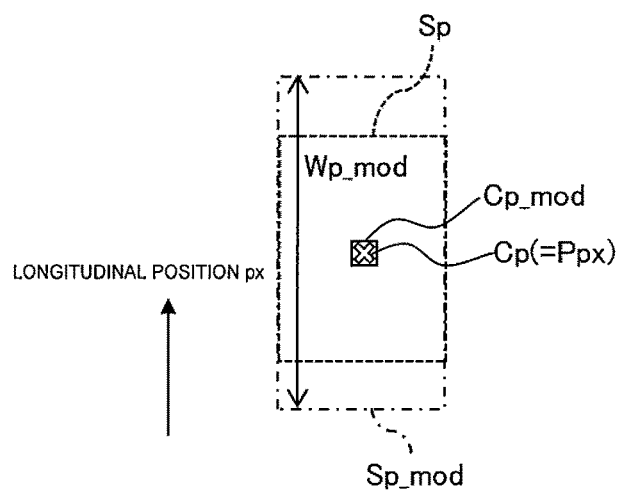
FIG. 6 is an explanatory diagram for illustrating a second example of the corrected association possible region generated by the correction unit in the first embodiment.

With reference to FIG. 6, description is now given of a second example in which the correction unit 114 uses the correction amount Mp to generate the corrected association possible region Sp_mod. FIG. 6 is an explanatory diagram for illustrating the second example of the corrected association possible region Sp_mod generated by the correction unit 114 in the first embodiment.

As the second example, the correction unit 114 corrects the size of the association possible region Sp illustrated in FIG. 4, to thereby generate the corrected association possible region Sp_mod illustrated in FIG. 6. That is, the correction unit 114 uses the correction amount Mp to calculate a corrected longitudinal width Wp_mod in accordance with Expression (1-7).

$$Wp\_mod = Wp + Mp \times 2 \quad (1\text{-}7)$$

In the second example, it is assumed that the corrected center point Cp_mod of the corrected association possible region Sp_mod and the center point Cp of the association possible region Sp are the same.

The correction unit 114 generates, as the corrected association possible region Sp_mod, a region that has, as the center point, the corrected center point Cp_mod, that is, the center point Cp, and has a longitudinal width of the region changed from Wp to Wp_mod. As described above, the correction unit 114 uses the correction amount Mp to correct the association possible region Sp, to thereby generate the corrected association possible region Sp_mod.

Figure 7:
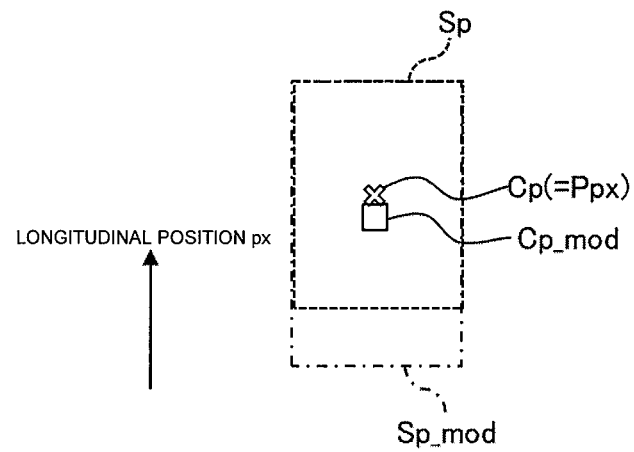
FIG. 7 is an explanatory diagram for illustrating a third example of the corrected association possible region generated by the correction unit in the first embodiment.

With reference to FIG. 7, description is now given of a third example in which the correction unit 114 uses the correction amount Mp to generate the corrected association possible region Sp_mod. FIG. 7 is an explanatory diagram for illustrating the third example of the corrected association possible region Sp_mod generated by the correction unit 114 in the first embodiment.

As the third example, the correction unit 114 corrects the center point Cp and the size of the association possible region Sp illustrated in FIG. 4, to thereby generate the corrected association possible region Sp_mod illustrated in FIG. 7. That is, the correction unit 114 uses the correction amount Mp to calculate the corrected center point Cp_mod and the corrected longitudinal width Wp_mod in accordance with Expression (1-8).

$$Cp\_mod = Cp + Mp \div 2$$

$$Wp\_mod = Wp + Mp \quad (1\text{-}8)$$

The correction unit 114 generates, as the corrected association possible region Sp_mod, the region that has the corrected center point Cp_mod as the center point, and has the longitudinal width of the region changed from Wp to Wp_mod. As described above, the correction unit 114 uses the correction amount Mp to correct the association possible region Sp, to thereby generate the corrected association possible region Sp_mod.

The association unit 115 uses the corrected association possible region Sp_mod generated by the correction unit 114 to determine the object data D correlating with the prediction data P generated by the prediction unit 112. That is, the association unit 115 uses the corrected association possible region Sp_mod to determine the association between the prediction data P and the object data D.

Specifically, the association unit 115 selects a combination having the smallest difference in the longitudinal position between the object data D and the prediction data P among all of combinations of the object data D and the prediction data P present in the corrected association possible region Sp_mod. The association unit 115 recognizes that the prediction data P and the object data D in the selected combination associate with each other.

The association unit 115 outputs, to the update unit 116, the prediction data P and the object data D in association with the determined association.

The update unit 116 uses the prediction data P generated by the prediction unit 112 and the object data D correlating with the prediction data P to update the track data F corresponding to the last object detection time, to thereby generate the track data F corresponding to the object detection time. That is, the update unit 116 uses the prediction data P and the object data D correlating with the prediction data P to update the last value of the track data F, to thereby generate the update result as the track data F. In other words, the update unit 116 incorporates the prediction data P and the object data D at the current object detection time into the track data F at the last object detection time, to thereby generate the track data F at the current object detection time. The update unit 116 outputs the generated track data F to the vehicle control device 200 and the prediction unit 112.

The update unit 116 is configured to use a known method to update the last value of the track data F. As the known method, the α-β filter and the Kalman filter are known, for example. When the object data D not correlating with the prediction data P exists, the update unit 116 outputs the object data D, as the track data F, to the vehicle control device 200 and the prediction unit 112.

The longitudinal position px included in the track data F is hereinafter referred to as "longitudinal position track value Fpx" as required. Similarly, the longitudinal speed vx included in the track data F is hereinafter referred to as "longitudinal speed track value Fvx."

The vehicle control device 200 uses the track data F obtained from the update unit 116 to control the ego vehicle. Specifically, the vehicle control device 200 uses the track data F to execute control for a collision mitigation brake system for reducing damage at the time when the ego vehicle collides with a forward obstacle, an adaptive cruise control system for following a preceding vehicle, and the like.

Figure 8:
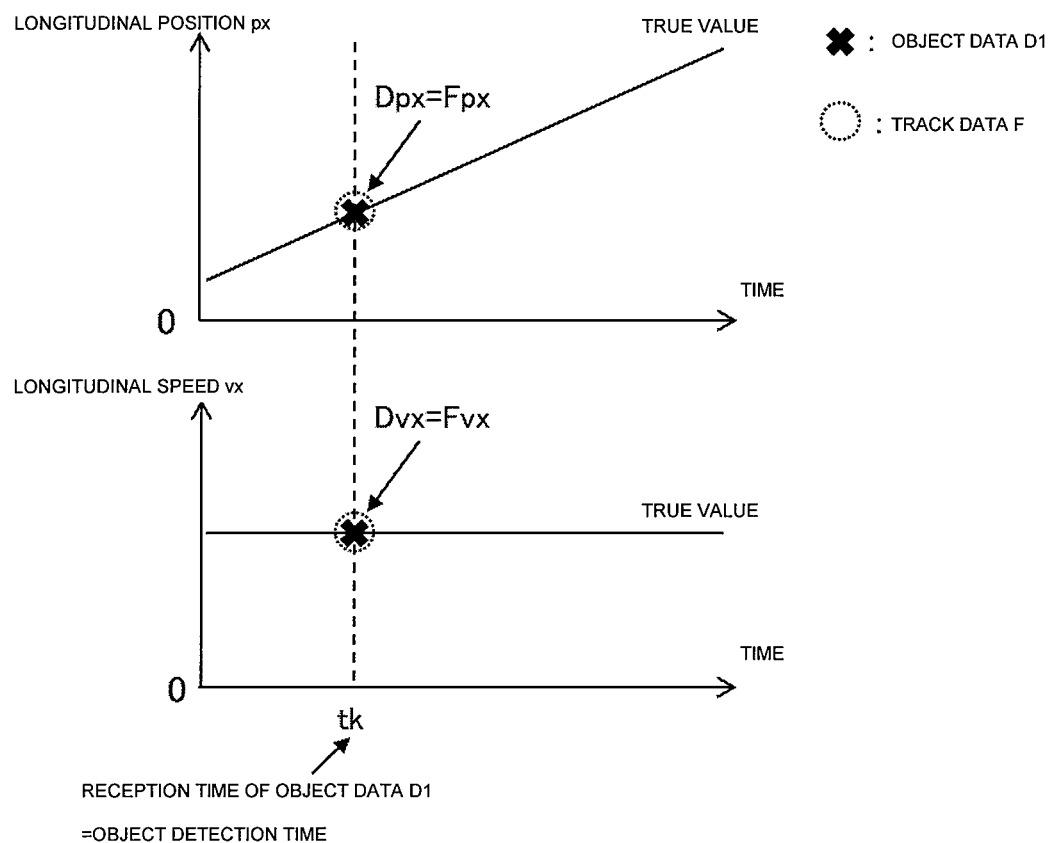
FIG. 8 shows explanatory graphs for showing track data at a time tk generated by the object recognition device according to the first embodiment.
Figure 9:
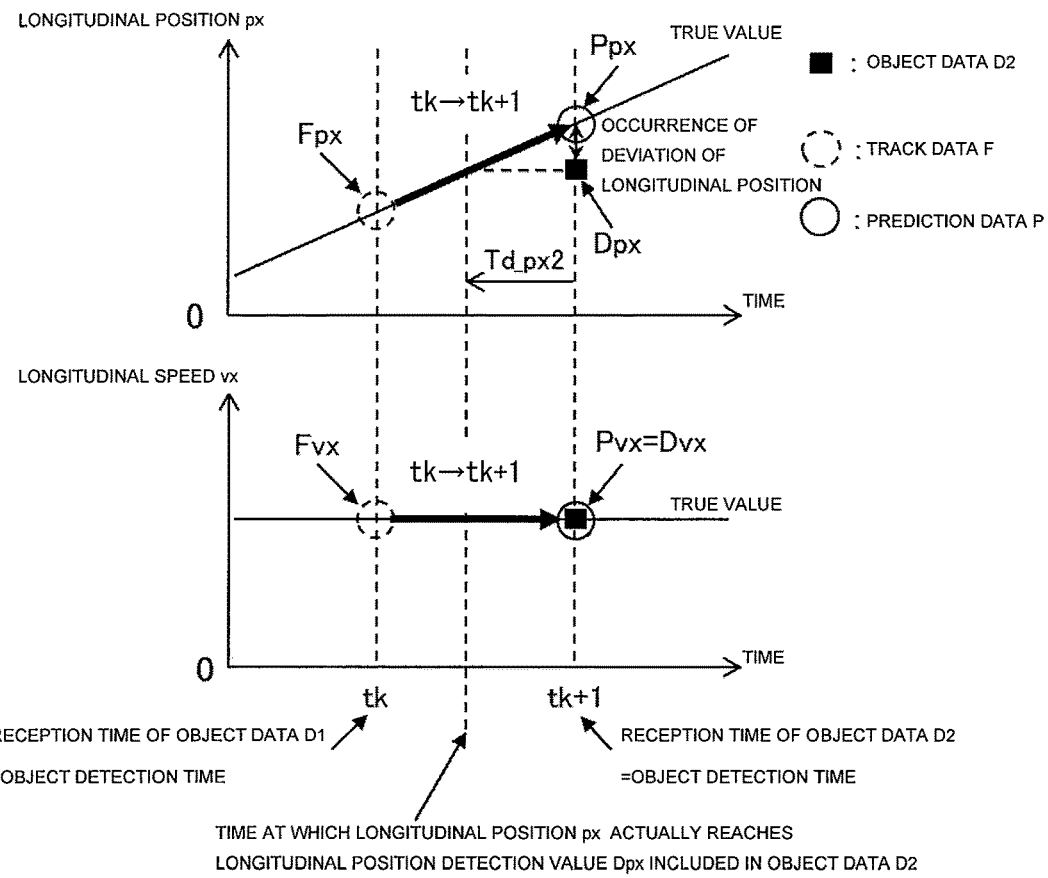
FIG. 9 shows explanatory graphs for showing prediction data at a time tk+1 generated by the object recognition device according to the first embodiment.

With reference to FIG. 8 and FIG. 9, description is now given of an operation example of the object recognition device 100 according to the first embodiment. FIG. 8 shows explanatory graphs for showing track data F(tk) at a time tk generated by the object recognition device 100 of the first embodiment. FIG. 9 shows explanatory graphs for showing prediction data P(tk+1) at a time tk+1 generated by the object recognition device 100 of the first embodiment.

In the situation shown in FIG. 8 and FIG. 9, the sensor delay time set value Td_set1, the longitudinal position delay time Td_px1, the longitudinal speed delay time Td_vx1, the sensor delay time set value Td_set2, the longitudinal position delay time Td_px2, and the longitudinal speed delay time Td_vx2 satisfy the following conditions, respectively.

Td_set1=Td_vx1=0
Td_px1=0
Td_vx1=0
Td_set2=Td_vx2=0
Td_px2>0
Td_vx2=0

As shown in FIG. 8, the track data F is not generated before the time tk. The data reception unit 111 receives the object data D1 from the first sensor 101 at the time tk. The object data D1 includes the longitudinal position detection value Dpx and the longitudinal speed detection value Dvx.

In the above-mentioned case, the data reception unit 111 subtracts the sensor delay time set value Td_set1 from the reception time at which the object data D1 was received, that is, tk, to thereby determine the object detection time. In this case, as described above, the condition of "Td_set1=Td_vx1=0" is satisfied, and the reception time and the object detection time are thus the same time, that is, the time tk. Moreover, the data reception unit 111 associates the received object data D1 with the object detection time, that is, the time tk.

Moreover, in the situation shown in FIG. 8, the track data F before the time tk does not exist. Thus, the prediction data P at the time tk, that is, the prediction data P(tk), is not to be generated by the prediction unit 112. In this case, the update unit 116 recognizes the object data D at the time tk, that is, the object data D(tk), as the track data F at the time tk, that is, the track data F(tk).

In other words, as shown in FIG. 8, the longitudinal position detection value Dpx included in the object data D(tk), that is, a longitudinal position detection value Dpx (tk), and the longitudinal position track value Fpx included in the track data F(tk), that is, a longitudinal position track value Fpx(tk), are equivalent to each other. Similarly, the longitudinal speed detection value Dvx included in the object data D(tk), that is, a longitudinal speed detection value Dvx(tk), and the longitudinal speed track value Fvx included in the track data F(tk), that is, a longitudinal speed track value Fvx(tk), are equivalent to each other.

After that, as shown in FIG. 9, the data reception unit 111 receives the object data D2 from the second sensor 102 at the time tk+1 subsequent to the time tk.

In the above-mentioned case, the data reception unit 111 subtracts the sensor delay time set value Td_set2 from the reception time at which the object data D2 was received, that is, tk+1, to thereby determine the object detection time. In this case, as described above, the condition of "Td_set2=Td_vx2=0" is satisfied, and the reception time and the object detection time are thus the same time, that is, the time tk+1. Moreover, the data reception unit 111 associates the received object data D2 with the object detection time, that is, the time tk+1.

The prediction unit 112 uses the track data F(tk) at the last object detection time, that is, the time tk, to generate the prediction data P(tk+1) being a prediction result of the track data F(tk+1) at the current object detection time, that is, the time tk+1, in accordance with a motion model determined in advance, specifically, a uniform linear motion model.

That is, the prediction unit 112 causes the longitudinal position track value Fpx(tk) to execute a uniform linear motion at the longitudinal speed track value Fvx(tk) from the time tk to the time tk+1, to thereby predict a longitudinal position track value Fpx(tk+1) at the time tk+1, and sets a result of the prediction as a longitudinal position prediction value Ppx(tk+1). Moreover, the prediction unit 112 sets the longitudinal speed track value Fvx(tk) as a longitudinal speed prediction value Pvx(tk+1) at the time tk+1.

The prediction unit 112 may cause a longitudinal position track value Fpx(tk−1) to execute a uniform linear motion at a longitudinal speed track value Fvx(tk−1) from the time tk−1 to the time tk+1, to thereby predict the longitudinal position track value Fpx(tk+1) at the time tk+1. Moreover, as described above, the longitudinal position track value Fpx(tk−1) and a longitudinal position detection value Dpx(tk−1) are equivalent to each other. Thus, the prediction unit 112 may use the longitudinal position detection value Dpx(tk−1) to similarly execute the prediction.

That is, the prediction unit 112 generates the prediction data P predicting the current object data D based on at least a part of the past object data D received by the data reception unit 111 and the motion model in the object. The correction unit 114 sets the association possible region for determining the association between the prediction data P and the current object data D based on at least one of the plurality of physical-quantity delay times each corresponding to each of the plurality of physical quantities included in the prediction data P.

In the first embodiment, the storage unit 113, the prediction unit 112, and the correction unit 114 are included in the setting unit 120. That is, the setting unit 120 generates the prediction data P predicting the current object data D based on at least a part of the past object data D received by the data reception unit 111 and the motion model in the object. The setting unit 120 sets the association possible region for determining the association between the prediction data P and the current object data D based on at least one of the plurality of physical-quantity delay times each corresponding to each of the plurality of physical quantities included in the prediction data P.

The past object data D may include both of the last object data D(tk) and second last object data D(tk−1). Moreover, the past object data D may be older than the second last object data D(tk−1). That is, the past object data D may include object data D corresponding to a plurality of cycles. The cycles are cycles at which the data reception unit 111 receives the object data D.

Moreover, the prediction unit 112 generates the association possible region Sp, which is a region centered around the generated longitudinal position prediction value Ppx(tk+1).

When object data D(tk+1) at the time tk+1 and the prediction data P(tk+1) at the time tk+1 are compared with each other, there exists a deviation between a longitudinal position detection value Dpx(tk+1) and the longitudinal position prediction value Ppx(tk+1) as shown in FIG. 9. This is because the condition of "Td_px2>0" is satisfied, that is, the longitudinal position delay time Td_px2 exists as described above.

When the deviation occurs between the longitudinal position detection value Dpx(tk+1) and the longitudinal position prediction value Ppx(tk+1) as described above, the center value of the association possible region Sp generated by the prediction unit 112 is at a position deviated from the longitudinal position detection value Dpx(tk+1). In this case, the longitudinal position detection value Dpx(tk+1) may not be present in the association possible region Sp having the longitudinal position prediction value Ppx(tk+1) as the center point. As a result, although the longitudinal position detection value Dpx(tk+1) and the longitudinal position prediction value Ppx(tk+1) result from the same object, those values may be incorrectly determined not to associate with each other.

To deal with this problem, in the first embodiment, the correction unit 114 is configured to correct the association possible region Sp based on the sensor delay time set values Td_set1 and Td_set2 and the physical-quantity delay time groups Td_ph1 and Td_ph2.

In the situation shown in FIG. 9, the sensor being the transmission source of the object data D associated with the last object detection time, that is, the time tk, is the first sensor 101. Moreover, the sensor being the transmission source of the object data D associated with the current object detection time, that is, the time tk+1, is the second sensor 102.

In the above-mentioned case, the correction unit 114 uses the sensor delay time set value Td_set1 and the longitudinal position delay time Td_px1 to calculate the time difference ΔTd_Ppx in accordance with Expression (1-1). In this case, the conditions of "Td_set1=Td_vx1=0" and "Td_px1=0" are satisfied as described above, and ΔTd_Ppx is thus 0.

After that, the correction unit 114 uses the sensor delay time set value Td_set2 and the longitudinal position delay time Td_px2 to calculate the time difference ΔTd_Dpx in accordance with Expression (1-4). In this case, the conditions of "Td_set2=Td_vx2=0" and "Td_px2>0" are satisfied as described above, and ΔTd_Dpx is thus −Td_px2.

After that, the correction unit 114 uses the time difference ΔTd_Ppx, the time difference ΔTd_Dpx, and the longitudinal speed prediction value Pvx(tk+1) to calculate the correction amount Mp for correcting the association possible region Sp in accordance with Expression (1-5).

The deviation amount between the longitudinal position detection value Dpx(tk+1) and the longitudinal position prediction value Ppx(tk+1) can be estimated through the above-mentioned calculations. In this case, the conditions of "ΔTd_Ppx=0" and "ΔTd_Dpx=−Td_px2" are satisfied, and Mp is thus Pvx(tk+1)×Td_px2.

After that, the correction unit 114 uses the calculated correction amount Mp to generate the corrected association possible region Sp_mod as described above. As a result, the association possible region Sp is corrected, and the association possible region Sp after the correction, that is, the corrected association possible region Sp_mod, is obtained.

The association unit 115 uses the above-mentioned corrected association possible region Sp_mod to determine the association between the prediction data P(tk+1) and the object data D(tk+1). As a result, there increases a possibility of a correct determination that the object data D(tk+1) including the longitudinal position detection value Dpx(tk+1) and the prediction data P(tk+1) including the longitudinal position prediction value Ppx(tk+1) associate with each other.

According to the first embodiment described above, the processing unit 110 of the object recognition device 100 is configured to correct the association possible region Sp based on the plurality of sensor delay time set values Td_set1 and Td_set2 corresponding to the plurality of sensors 101 and 102, respectively, and the plurality of physical-quantity delay time groups Td_ph1 and Td_ph2 corresponding to the plurality of sensors 101 and 102, respectively. The physical-quantity delay time group Td_ph1 includes the longitudinal position delay time Td_px1 and the longitudinal speed delay time Td_vx1 corresponding to the longitudinal position px and the longitudinal speed vx, respectively. The physical-quantity delay time group Td_ph2 includes the longitudinal position delay time Td_px2 and the longitudinal speed delay time Td_vx2 corresponding to the longitudinal position px and the longitudinal speed vx, respectively.

As described above, precision of the object recognition can be increased, compared with a related-art object recognition device, through the correction of the association possible region Sp in consideration of the physical-quantity delay times of the sensors. That is, it is possible to suppress the occurrence of the error in the association between the object data D and the prediction data P determined by the object recognition device, and it is consequently possible to suppress deterioration of the precision of the recognition of the object.

Second Embodiment

In a second embodiment of the present invention, description is given of an object recognition device 100 configured to correct the association possible region Sp and a association possible region Sv which are used to determine the association between the prediction data P and the object data D. In the second embodiment, the storage unit 113, the prediction unit 112, and the correction unit 114 are included in the setting unit 120. In the second embodiment, description of the same points as those in the first embodiment are omitted, and description is mainly given of points different from those in the first embodiment.

In the first embodiment described above, the association possible region Sp corresponding to the longitudinal position px is used to determine the association between the prediction data P and the object data D. The object recognition device 100 according to the first embodiment is configured to correct the association possible region Sp. In contrast, in the second embodiment, the association possible region Sv corresponding to the longitudinal speed vx in addition to the association possible region Sp is used to determine the association between the prediction data P and the object data D. The object recognition device 100 according to the second embodiment is configured to correct the association possible region Sp and the association possible region Sv.

The prediction unit 112 generates, as in the first embodiment, the association possible region Sp corresponding to the longitudinal position px based on the longitudinal position prediction value Ppx included in the generated prediction data P. Further, the prediction unit 112 generates the association possible region Sv corresponding to the longitudinal speed vx based on the longitudinal speed prediction value Pvx included in the generated prediction data P. Specifically, the prediction unit 112 generates the association possible region Sv being a region centered around the longitudinal speed prediction value Pvx included in the generated prediction data P. The prediction unit 112 outputs the generated prediction data P, the association possible region Sp, and the association possible region Sv to the correction unit 114.

Figure 10:
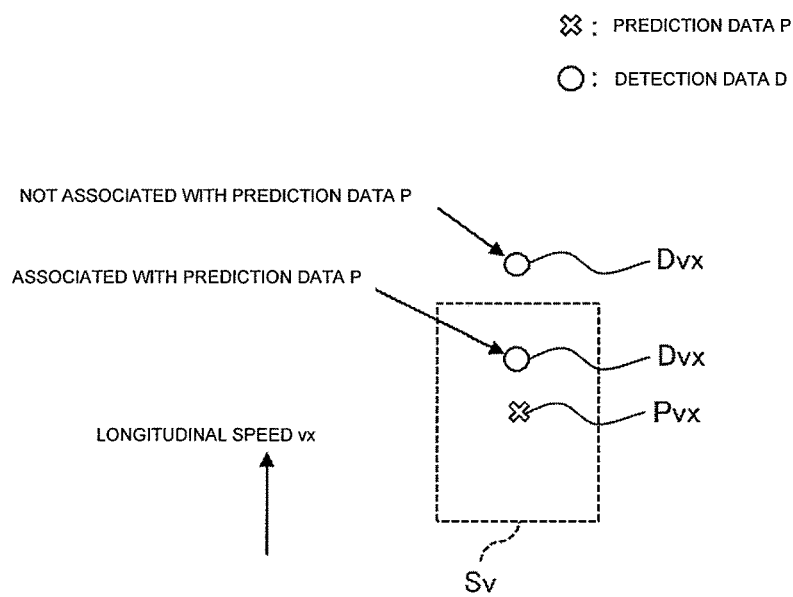
FIG. 10 is an explanatory diagram for illustrating an example of a association possible region generated by the prediction unit in a second embodiment of the present invention.

With reference to FIG. 10, description is now given of an example of the association possible region Sv generated by the prediction unit 112. FIG. 10 is an explanatory diagram for illustrating an example of the association possible region Sv generated by the prediction unit 112 in the second embodiment.

As illustrated in FIG. 10, the association possible region Sv is the region centered around the longitudinal speed prediction value Pvx included in the prediction data P. A shape and a size of the association possible region Sv are determined in advance, and the association possible region Sv is thus uniquely determined based on the longitudinal speed prediction value Pvx.

The association possible region Sv is a region for determining, along with the association possible region Sp, a association between the prediction data P and the object data D.

That is, when the longitudinal position detection value Dpx included in the object data D is present in the association possible region Sp, and the longitudinal speed detection value Dvx included in the object data D is present in the association possible region Sv, it is recognized that the prediction data P and the object data D associate with each other. Meanwhile, when the longitudinal position detection value Dpx is present outside the association possible region Sp, or when the longitudinal speed detection value Dvx is present outside the association possible region Sv, it is recognized that the prediction data P and the object data D do not associate with each other.

The physical-quantity delay time group Td_ph1 includes the longitudinal position delay time Td_px1 corresponding to the longitudinal position px and the longitudinal speed delay time Td_vx1 corresponding to the longitudinal speed vx as described above. The physical-quantity delay time group Td_ph2 includes the longitudinal position delay time Td_px2 corresponding to the longitudinal position px and the longitudinal speed delay time Td_vx2 corresponding to the longitudinal speed vx.

The correction unit 114 corrects, based on the sensor delay time set values Td_set1 and Td_set2 and the physical-quantity delay time groups Td_ph1 and Td_ph2, the association possible region Sp generated by the prediction unit 112, to thereby generate the corrected association possible region Sp_mod corresponding to the longitudinal position px. Further, the correction unit 114 corrects, based on the sensor delay time set values Td_set1 and Td_set2 and the physical-quantity delay time groups Td_ph1 and Td_ph2, the association possible region Sv generated by the prediction unit 112, to thereby generate a corrected association possible region Sv_mod corresponding to the longitudinal speed vx. The correction unit 114 outputs the generated corrected association possible regions Sp_mod and Sv_mod to the association unit 115.

Figure 11:
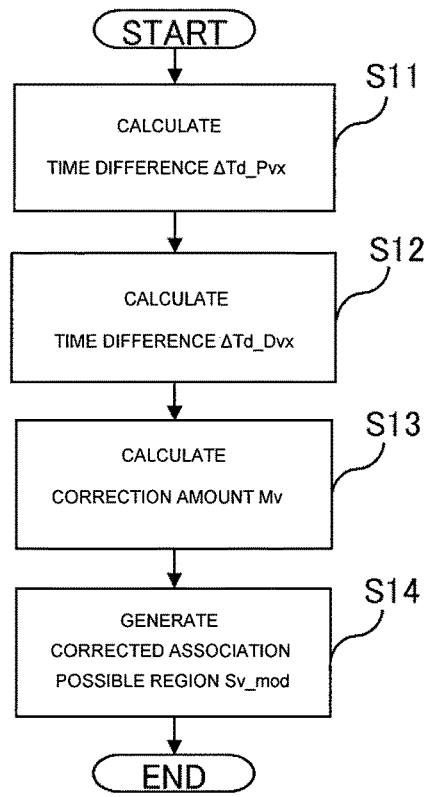
FIG. 11 is a flowchart for illustrating a series of processing procedures for generating, by the correction unit, a corrected association possible region in the second embodiment.

The processing of generating the corrected association possible region Sp_mod by the correction unit 114 is the same as that in the first embodiment. With reference to FIG. 11, description is now given of processing for generating the corrected association possible region Sv_mod by the correction unit 114. FIG. 11 is a flowchart for illustrating a series of processing procedures for generating, by the correction unit 114, the corrected association possible region Sv_mod in the second embodiment.

In Step S11, in the manner described below, the correction unit 114 calculates a time difference $\Delta Td\_Pvx$ corresponding to the prediction data P generated by the prediction unit 112 based on the sensor delay time set values Td_set1 and Td_set2 and the longitudinal speed delay times Td_vx1 and Td_vx2.

That is, the correction unit 114 identifies the sensor being the transmission source of the object data D associated with the last object detection time. When the identified sensor is the first sensor 101, the correction unit 114 uses the sensor delay time set value Td_set1 and the longitudinal speed delay time Td_vx1 to calculate the time difference $\Delta Td\_Pvx$ in accordance with Expression (2-1).

$$\Delta Td\_Pvx = Td\_set1 - Td\_vx1 \quad (2\text{-}1)$$

Meanwhile, when the identified sensor is the second sensor 102, the correction unit 114 uses the sensor delay time set value Td_set2 and the longitudinal speed delay time Td_vx2 to calculate the time difference $\Delta Td\_Pvx$ in accordance with Expression (2-2).

$$\Delta Td\_Pvx = Td\_set2 - Td\_vx2 \quad (2\text{-}2)$$

After that, in Step S12, in the manner described below, the correction unit 114 calculates a time difference $\Delta Td\_Dvx$ corresponding to the object data D received by the data reception unit 111 based on the sensor delay time set values Td_set1 and Td_set2 and the physical-quantity delay time groups Td_ph1 and Td_ph2.

That is, the correction unit 114 identifies the sensor being the transmission source of the object data D received by the data reception unit 111. When the identified sensor is the first sensor 101, the correction unit 114 uses the sensor delay time set value Td_set1 and the longitudinal speed delay time Td_vx1 to calculate the time difference $\Delta Td\_Dvx$ in accordance with Expression (2-3).

$$\Delta Td\_Dvx = Td\_set1 - Td\_vx1 \quad (2\text{-}3)$$

Meanwhile, when the identified sensor is the second sensor 102, the correction unit 114 uses the sensor delay time set value Td_set2 and the longitudinal speed delay time Td_vx2 to calculate the time difference $\Delta Td\_Dvx$ in accordance with Expression (2-4).

$$\Delta Td\_Dvx = Td\_set2 - Td\_vx2 \quad (2\text{-}4)$$

After that, in Step S13, the correction unit 114 uses the time difference $\Delta Td\_Pvx$ calculated in Step S11, the time difference $\Delta Td\_Dvx$ calculated in Step S12, and a longitudinal acceleration prediction value Pax to calculate a correction amount MY for correcting the association possible region Sv in accordance with Expression (2-5). The longitudinal acceleration prediction value Pax is obtained by, for example, differentiating, with respect to time, the longitudinal speed prediction value Pvx included in the prediction data P generated by the prediction unit 112.

$$Mv = Pax \times (\Delta Td\_Pvx - \Delta Td\_Dvx) \quad (2\text{-}5)$$

After that, in Step S14, the correction unit 114 uses the correction amount MY calculated in Step S13 to correct the association possible region Sv generated by the prediction unit 112, to thereby generate the corrected association possible region Sv_mod.

Figure 12:
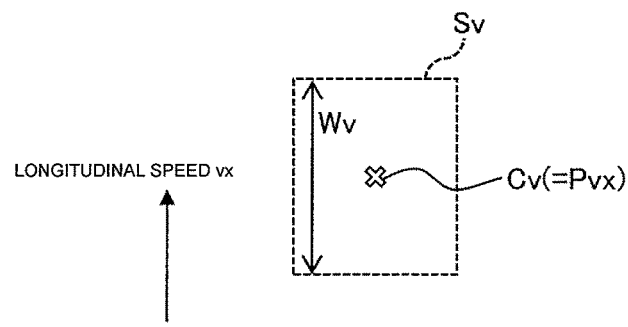
FIG. 12 is an explanatory diagram for illustrating an example of the association possible region obtained from the prediction unit by the correction unit in the second embodiment.
Figure 13:
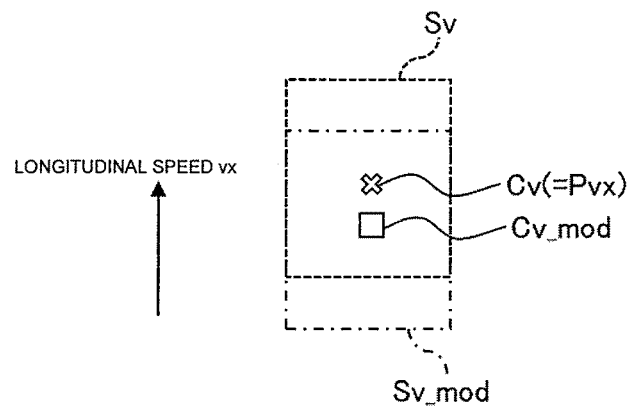
FIG. 13 is an explanatory diagram for illustrating a first example of the corrected association possible region generated by the correction unit in the second embodiment.

With reference to FIG. 12 and FIG. 13, description is now given of a first example in which the correction unit 114 uses the correction amount MY to generate the corrected association possible region Sv_mod. FIG. 12 is an explanatory diagram for illustrating an example of the association possible region Sv obtained from the prediction unit 112 by the correction unit 114 in the second embodiment. FIG. 13 is an explanatory diagram for illustrating the first example of the corrected association possible region Sv_mod generated by the correction unit 114 in the second embodiment.

As described above, the association possible region Sv illustrated in FIG. 12 is the region having, as the center point, the longitudinal speed prediction value Pvx included in the prediction data P. The center point of the association possible region Sv is hereinafter referred to as "center point Cy." A longitudinal width of the association possible region Sv is hereinafter referred to as "longitudinal width Wv."

As the first example, the correction unit 114 corrects the center point Cv of the association possible region Sv illustrated in FIG. 12, to thereby generate the corrected association possible region Sv_mod illustrated in FIG. 13. That is, the correction unit 114 uses the correction amount MY to calculate a corrected center point Cv_mod being a center point of the corrected association possible region Sv_mod in accordance with Expression (2-6).

$$Cv\_mod = Cv + Mv \quad (2\text{-}6)$$

In the first example, it is assumed that a corrected longitudinal width Wv_mod being a longitudinal width of the corrected association possible region Sv_mod and the longitudinal width Wv of the association possible region Sv are the same.

The correction unit 114 generates, as the corrected association possible region Sv_mod, the region having the calculated corrected center point Cv_mod as the center point. As described above, the correction unit 114 uses the correction amount MY to correct the association possible region Sv, to thereby generate the corrected association possible region Sv_mod.

Figure 14:
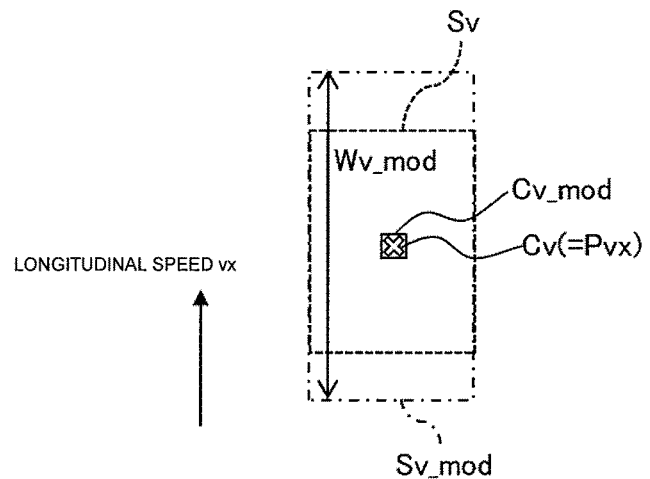
FIG. 14 is an explanatory diagram for illustrating a second example of the corrected association possible region generated by the correction unit in the second embodiment.

With reference to FIG. 14, description is now given of a second example in which the correction unit 114 uses the correction amount Mv to generate the corrected association possible region Sv_mod. FIG. 14 is an explanatory diagram for illustrating the second example of the corrected association possible region Sv_mod generated by the correction unit 114 in the second embodiment.

As the second example, the correction unit 114 corrects the size of the association possible region Sv illustrated in FIG. 12, to thereby generate the corrected association possible region Sv_mod illustrated in FIG. 14. That is, the correction unit 114 uses the correction amount MY to calculate a corrected longitudinal width Wv_mod in accordance with Expression (2-7).

$$Wv\_mod = Wv + Mv \times 2 \quad (2\text{-}7)$$

In the second example, it is assumed that the corrected center point Cv_mod of the corrected association possible region Sv_mod and the center point Cv of the association possible region Sv are the same.

The correction unit 114 generates, as the corrected association possible region Sv_mod, a region that has, as the center point, the corrected center point Cv_mod, that is, the center point Cv, and has a longitudinal width of the region changed from Wv to Wv_mod. As described above, the correction unit 114 uses the correction amount MY to correct the association possible region Sv, to thereby generate the corrected association possible region Sv_mod.

Figure 15:
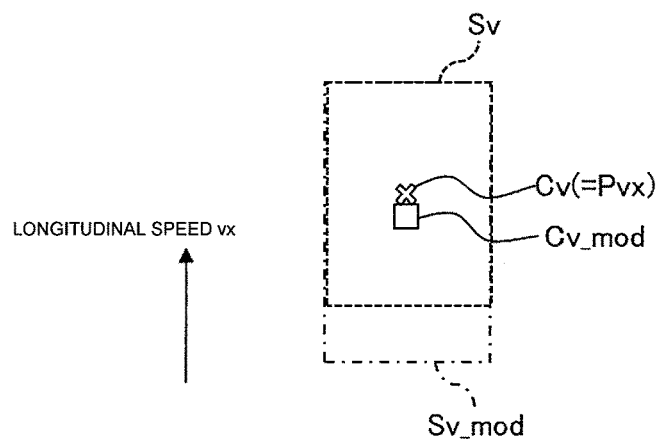
FIG. 15 is an explanatory diagram for illustrating a third example of the corrected association possible region generated by the correction unit in the second embodiment.

With reference to FIG. 15, description is now given of a third example in which the correction unit 114 uses the correction amount MY to generate the corrected association possible region Sv_mod. FIG. 15 is an explanatory diagram for illustrating the third example of the corrected association possible region Sv_mod generated by the correction unit 114 in the second embodiment.

As the third example, the correction unit 114 corrects the center point Cv and the size of the association possible region Sv illustrated in FIG. 12, to thereby generate the corrected association possible region Sv_mod illustrated in FIG. 15. That is, the correction unit 114 uses the correction amount MY to calculate the corrected center point Cv_mod and the corrected longitudinal width Wv_mod in accordance with Expression (2-8).

$$Cv\_mod = Cv + Mv \div 2$$

$$Wv\_mod = Wv + Mv \quad (2\text{-}8)$$

The correction unit 114 generates, as the corrected association possible region Sv_mod, the region that has the corrected center point Cv_mod as the center point, and has the longitudinal width of the region changed from Wv to Wv_mod. As described above, the correction unit 114 uses the correction amount Mv to correct the association possible region Sv, to thereby generate the corrected association possible region Sv_mod.

The association unit 115 uses the corrected association possible regions Sp_mod and Sv_mod generated by the correction unit 114 to determine the object data D correlating with the prediction data P generated by the prediction unit 112. That is, the association unit 115 uses the corrected association possible regions Sp_mod and Sv_mod to determine the association between the prediction data P and the object data D.

Figure 16:
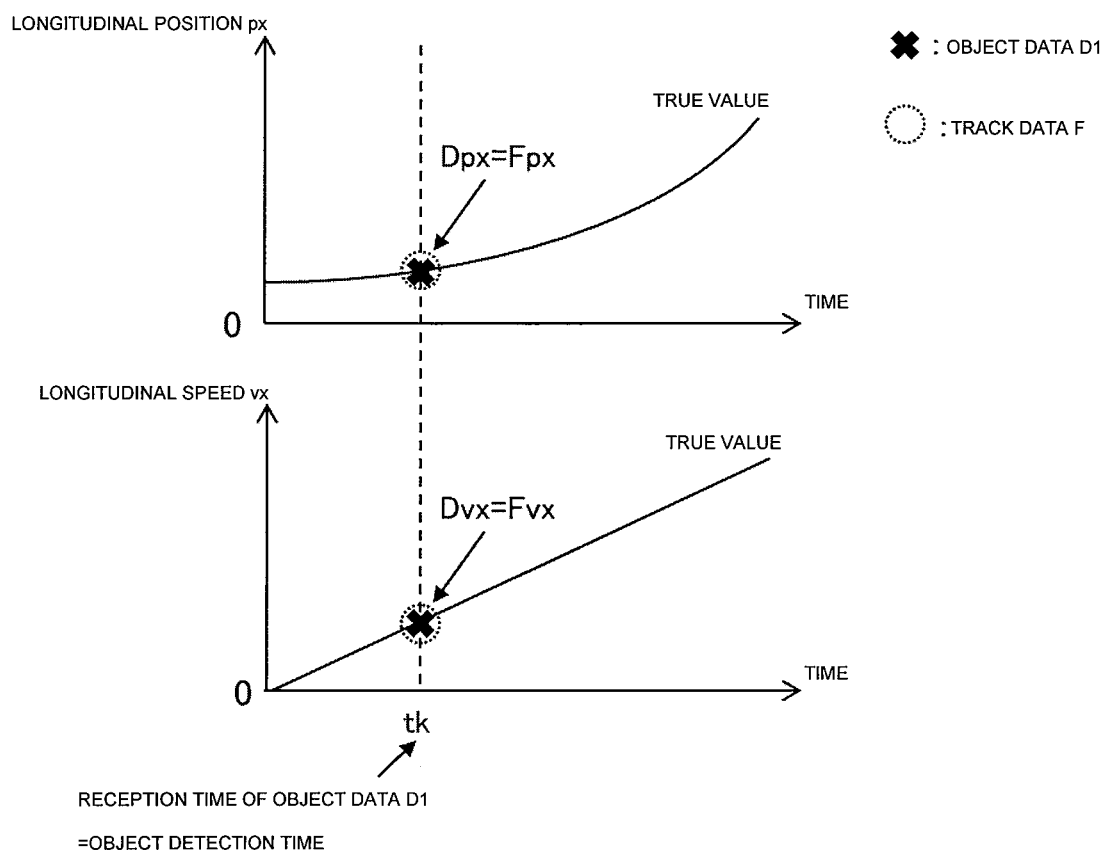
FIG. 16 shows explanatory graphs for showing track data at the time tk generated by an object recognition device according to the second embodiment.
Figure 17:
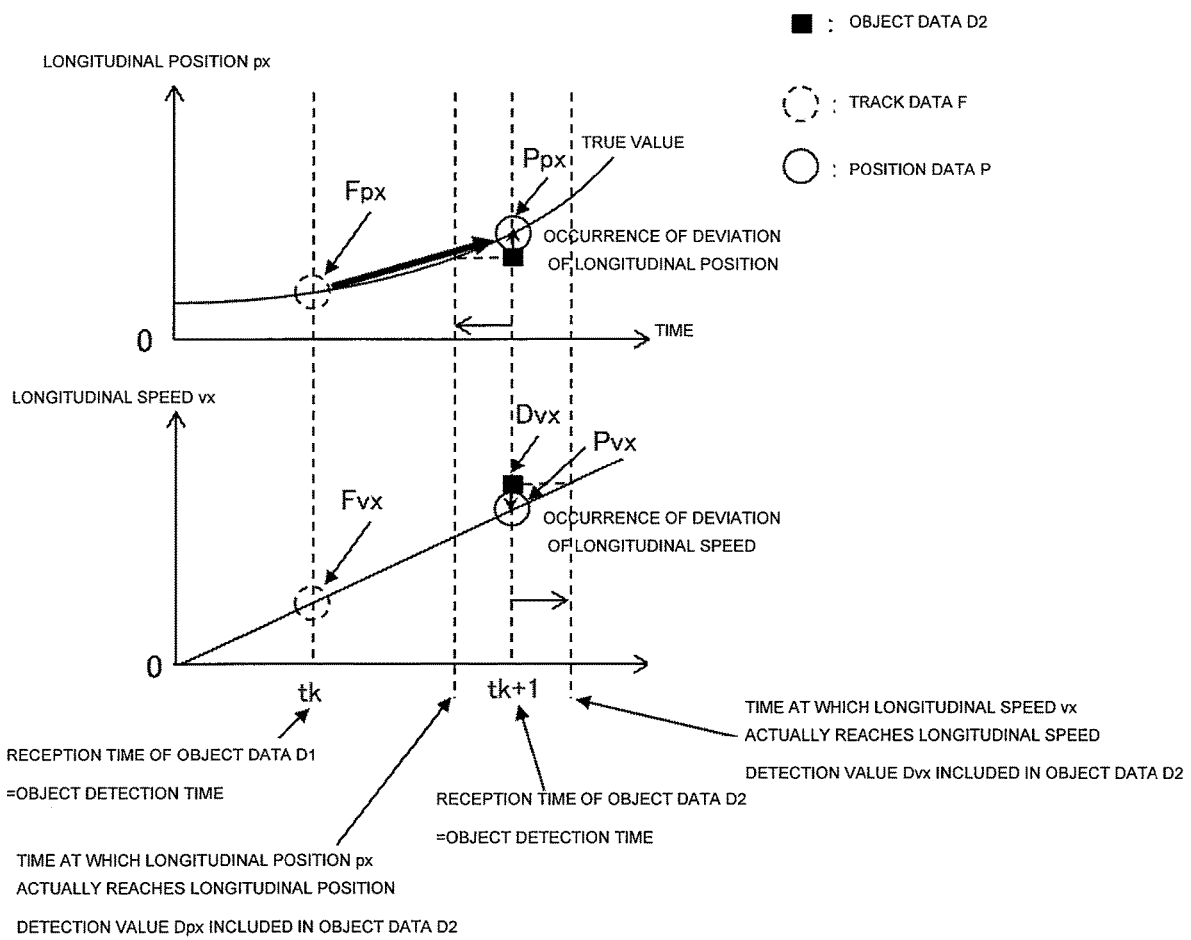
FIG. 17 shows explanatory graphs for showing prediction data at the time tk+1 generated by the object recognition device according to the second embodiment.

With reference to FIG. 16 and FIG. 17, description is now given of an operation example of the object recognition device 100 according to the second embodiment. FIG. 16 shows explanatory graphs for showing track data F(tk) at a time tk generated by the object recognition device 100 of the second embodiment. FIG. 17 shows explanatory graphs for showing prediction data P(tk+1) at a time tk+1 generated by the object recognition device 100 of the second embodiment.

In the situation shown in FIG. 16 and FIG. 17, the sensor delay time set value Td_set1, the longitudinal position delay time Td_px1, the longitudinal speed delay time Td_vx1, the sensor delay time set value Td_set2, the longitudinal position delay time Td_px2, and the longitudinal speed delay time Td_vx2 satisfy the following conditions, respectively.

Td_set1=Td_vx1=0
Td_px1=0
Td_vx1=0
Td_set2=0
Td_px2>0
Td_vx2>0

As shown in FIG. 16, the track data F is not generated before the time tk. The data reception unit 111 receives the object data D1 from the first sensor 101 at the time tk. The object data D1 includes the longitudinal position detection value Dpx and the longitudinal speed detection value Dvx.

In the above-mentioned case, the data reception unit 111 subtracts the sensor delay time set value Td_set1 from the reception time at which the object data D1 was received, that is, tk, to thereby determine the object detection time. In this case, as described above, the condition of "Td_set1=0" is satisfied, and the reception time and the object detection time are thus the same time, that is, the time tk. Moreover, the data reception unit 111 associates the received object data D1 with the object detection time, that is, the time tk.

Moreover, in the situation shown in FIG. 16, the track data F before the time tk does not exist. Thus, the prediction data P at the time tk, that is, prediction data P(tk), is not to be generated by the prediction unit 112. In this case, the update unit 116 recognizes the object data D at the time tk, that is, object data D(tk), as the track data F at the time tk, that is, the track data F(tk).

In other words, as shown in FIG. 16, the longitudinal position detection value Dpx included in the object data D(tk), that is, the longitudinal position detection value Dpx(tk), and the longitudinal position track value Fpx included in the track data F(tk), that is, the longitudinal position track value Fpx(tk), are equivalent to each other. Similarly, the longitudinal speed detection value Dvx included in the object data D(tk), that is, the longitudinal speed detection value Dvx(tk), and the longitudinal speed track value Fvx included in the track data F(tk), that is, the longitudinal speed track value Fvx(tk), are equivalent to each other.

After that, as shown in FIG. 17, the data reception unit 111 receives the object data D2 from the second sensor 102 at the time tk+1 subsequent to the time tk.

In the above-mentioned case, the data reception unit 111 subtracts the sensor delay time set value Td_set2 from the reception time at which the object data D2 was received, that is, tk+1, to thereby determine the object detection time. In this case, as described above, the condition of "Td_set2=0" is satisfied, and the reception time and the object detection time are thus the same time, that is, the time tk+1. Moreover, the data reception unit 111 associates the received object data D2 with the object detection time, that is, the time tk+1.

The prediction unit 112 uses the track data F(tk) at the last object detection time, that is, the time tk, to generate the prediction data P(tk+1) being a prediction result of the track data F(tk+1) at the current object detection time, that is, the time tk+1, in accordance with the motion model determined in advance, specifically, a uniform accelerated linear motion model.

That is, the prediction unit 112 performs time transition from the time tk to the time tk+1 having the longitudinal speed track value Fvx(tk) as an initial speed on the longitudinal position track value Fpx(tk) in accordance with the uniform accelerated linear motion model, to thereby predict the longitudinal position track value Fpx(tk+1) at the time tk+1, and sets a result of the prediction as the longitudinal position prediction value Ppx(tk+1). Moreover, the prediction unit 112 performs time transition from the time tk to the time tk+1 on the longitudinal speed track value Fvx(tk) in accordance with the uniform accelerated linear motion model, to thereby predict the longitudinal speed track value Fvx(tk+1) at the time tk+1, and sets a result of the prediction as the longitudinal speed prediction value Pvx(tk+1).

Moreover, the prediction unit 112 generates the association possible region Sp, which is the region centered around the generated longitudinal position prediction value Ppx(tk+1). Further, the prediction unit 112 generates the association possible region Sv, which is a region centered around the generated longitudinal speed prediction value Pvx(tk+1).

When object data D(tk+1) at the time tk+1 and the prediction data P(tk+1) at the time tk+1 are compared with each other, there exists a deviation between the longitudinal position detection value Dpx(tk+1) and the longitudinal position prediction value Ppx(tk+1) as shown in FIG. 17. This is because the condition of "Td_px2>0" is satisfied, that is, the longitudinal position delay time Td_px2 exists as described above.

Moreover, as shown in FIG. 17, there exists a deviation between the longitudinal speed detection value Dvx(tk+1) and the longitudinal speed prediction value Pvx(tk+1). This is because the condition of "Td_vx2>0" is satisfied, that is, the longitudinal speed delay time Td_vx2 exists as described above.

When the deviation occurs between the longitudinal position detection value Dpx(tk+1) and the longitudinal position prediction value Ppx(tk+1) as described above, the center value of the association possible region Sp generated by the prediction unit 112 is at a position deviated from the longitudinal position detection value Dpx(tk+1). In this case, the longitudinal position detection value Dpx(tk+1) may not be present in the association possible region Sp having the longitudinal position prediction value Ppx(tk+1) as the center point. Moreover, when the deviation occurs between the longitudinal speed detection value Dvx(tk+1) and the longitudinal speed prediction value Pvx(tk+1), the center value of the association possible region Sv generated by the prediction unit 112 is at a position deviated from the longitudinal speed detection value Dvx(tk+1). In this case, the longitudinal speed detection value Dvx(tk+1) may not be present in the association possible region Sv having, as the center point, the longitudinal speed prediction value Pvx(tk+1). As a result, although the object data D including the longitudinal position detection value Dpx(tk+1) and the longitudinal speed detection value Dvx(tk+1) and the prediction data P including the longitudinal position prediction value Ppx(tk+1) and the longitudinal speed prediction value Pvx(tk+1) result from the same object, those values may be incorrectly determined not to associate with each other.

To deal with this problem, in the second embodiment, the correction unit 114 is configured to correct the association possible regions Sp and Sv based on the sensor delay time set values Td_set1 and Td_set2 and the physical-quantity delay time groups Td_ph1 and Td_ph2.

In the situation shown in FIG. 17, the sensor being the transmission source of the object data D associated with the last object detection time, that is, the time tk, is the first sensor 101. Moreover, the sensor being the transmission source of the object data D associated with the current object detection time, that is, the time tk+1, is the second sensor 102.

In the above-mentioned case, the correction unit 114 executes the same calculation as that in the first embodiment, to thereby generate the corrected association possible region Sp_mod. As a result, the association possible region Sp is corrected, and the association possible region Sp after the correction, that is, the corrected association possible region Sp_mod, is obtained.

Further, the correction unit 114 uses the sensor delay time set value Td_set1 and the longitudinal speed delay time Td_vx1 to calculate the time difference ΔTd_Pvx in accordance with Expression (2-1). In this case, the conditions of "Td_set1=0" and "Td_vx1=0" are satisfied as described above, and ΔTd_Pvx is thus 0.

After that, the correction unit 114 uses the sensor delay time set value Td_set2 and the longitudinal speed delay time Td_vx2 to calculate the time difference ΔTd_Dvx in accordance with Expression (2-4). In this case, the conditions of "Td_set2=0" and "Td_vx2>0" are satisfied as described above, and ΔTd_Dvx is thus −Td_vx2.

After that, the correction unit 114 uses the time difference ΔTd_Pvx, the time difference ΔTd_Dvx, and the longitudinal acceleration prediction value Pax(tk+1) to calculate the correction amount My for correcting the association possible region Sv in accordance with Expression (2-5). The deviation amount between the longitudinal speed detection value Dvx(tk+1) and the longitudinal speed prediction value Pvx(tk+1) can be estimated through the above-mentioned calculations. In this case, the conditions of "ΔTd_Pvx=0" and "ΔTd_Dvx=−Td_vx2" are satisfied, and My is thus Pax(tk+1)×Td_vx2.

After that, the correction unit 114 uses the calculated correction amount MY to generate the corrected association possible region Sv_mod as described above. As a result, the association possible region Sv is corrected, and the association possible region Sv after the correction, that is, the corrected association possible region Sv_mod, is obtained.

The association unit 115 uses the above-mentioned corrected association possible region Sp_mod and the corrected association possible region Sv_mod to determine the association between the prediction data P(tk+1) and the object data D(tk+1). As a result, there increases a possibility of a correct determination that the object data D(tk+1) including the longitudinal position detection value Dpx(tk+1) and the longitudinal speed detection value Dvx(tk+1), and the prediction data P(tk+1) including the longitudinal position prediction value Ppx(tk+1) and the longitudinal speed prediction value Pvx(tk+1) associate with each other.

According to the second embodiment described above, in addition to the configuration of the first embodiment, the processing unit 110 of the object recognition device 100 is configured to further correct the association possible region Sv based on the plurality of sensor delay time set values Td_set1 and Td_set2 corresponding to the plurality of sensors 101 and 102, respectively, and the plurality of physical-quantity delay time groups Td_ph1 and Td_ph2 corresponding to the plurality of sensors 101 and 102, respectively.

As a result, even in the case in which the association possible region Sv is used in addition to the association possible region Sp, it is possible to suppress the occurrence of the error in the association between the object data D and the prediction data P determined by the object recognition device. Consequently, it is possible to suppress the deterioration of the precision of the recognition of the object.

In the configuration of the first embodiment, there is exemplified the case in which the association possible region Sp corresponding to the longitudinal position px is used as the association possible region for determining the association between the prediction data P and the object data D. However, the configuration is not limited to this example, and compared with the configuration of the first embodiment, the association possible region Sv may be used in place of the association possible region Sp.

Third Embodiment

In a third embodiment of the present invention, description is given of an object recognition device 100 including the processing unit 110 configured to estimate each of the physical-quantity delay time group Td_ph1 and the physical-quantity delay time group Td_ph2 in consideration of states of the ego vehicle. In the third embodiment, a delay time estimation unit 117, the prediction unit 112, and the correction unit 114 are included in the setting unit 120. In the third embodiment, description of the same points as those in the first and second embodiments are omitted, and description is mainly given of points different from those in the first and second embodiments.

In the first and second embodiments described above, the physical-quantity delay time group Td_ph1 and the physical-quantity delay time group Td_ph2 are fixed values determined in advance. Meanwhile, in the third embodiment, it is assumed that the physical-quantity delay time group Td_ph1 and the physical-quantity delay time group Td_ph2 are values that change in accordance with the states of the ego vehicle, for example, the acceleration of the ego vehicle.

Figure 18:
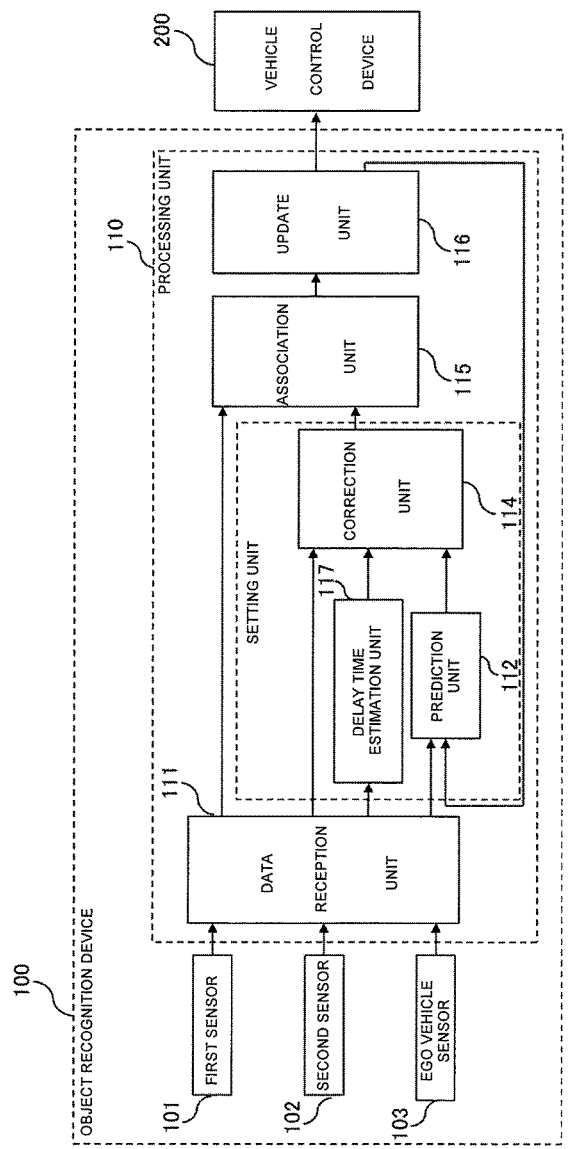
FIG. 18 is a block diagram for illustrating a configuration of a vehicle control system including an object recognition device according to a third embodiment of the present invention.

FIG. 18 is a block diagram for illustrating a configuration of a vehicle control system including the object recognition device 100 according to the third embodiment. In FIG. 18, the vehicle control system is installed in the ego vehicle, and includes the object recognition device 100 and the vehicle control device 200.

The object recognition device 100 includes the first sensor 101, the second sensor 102, an ego vehicle sensor 103, and the processing unit 110.

The ego vehicle sensor 103 detects the states of the ego vehicle, and transmits ego vehicle data including physical quantities indicating the states of the ego vehicle to the processing unit 110. As the physical quantities indicating the states of the ego vehicle, there are known, for example, the speed of the ego vehicle, the acceleration of the ego vehicle, and a yaw rate of the ego vehicle.

The processing unit 110 includes the data reception unit 111, the prediction unit 112, the delay time estimation unit 117, the correction unit 114, the association unit 115, and the update unit 116.

The data reception unit 111 associates the object data D1 received from the first sensor 101 with the determined object detection time, outputs the associated object data D1 to the prediction unit 112, the correction unit 114, and the association unit 115 as in the first and second embodiments, and further outputs the associated object data D1 to the delay time estimation unit 117.

Similarly, the data reception unit 111 associates the object data D2 received from the second sensor 102 with the determined object detection time, outputs the associated object data D2 to the prediction unit 112, the correction unit 114, and the association unit 115, and further outputs the associated object data D2 to the delay time estimation unit 117. Further, the data reception unit 111 receives the ego vehicle data from the ego vehicle sensor 103, and outputs the received ego vehicle data to the delay time estimation unit 117.

The delay time estimation unit 117 estimates each of the physical-quantity delay time group Td_ph1 and the physical-quantity delay time group Td_ph2 based on the ego vehicle data transmitted by the ego vehicle sensor 103. Specifically, the delay time estimation unit 117 holds in advance a first map associating the acceleration of the ego vehicle, and the longitudinal position delay time Td_px1 and the longitudinal speed delay time Td_vx1 with each other. The first map is obtained through an experiment for verifying, in advance, what values the longitudinal position delay time Td_px1 and the longitudinal speed delay time Td_vx1 take in accordance with the value of the acceleration of the ego vehicle.

Similarly, the delay time estimation unit 117 holds in advance a second map associating the acceleration of the ego vehicle, and the longitudinal position delay time Td_px2 and the longitudinal speed delay time Td_vx2 with each other. The second map is obtained through an experiment for verifying, in advance, what values the longitudinal position delay time Td_px2 and the longitudinal speed delay time Td_vx2 take in accordance with the value of the acceleration of the ego vehicle.

When the sensor being the transmission source of the object data D input from the data reception unit 111 is the first sensor 101, the delay time estimation unit 117 uses the first map to estimate the longitudinal position delay time Td_px1 and the longitudinal speed delay time Td_vx1 included in the physical-quantity delay time group Td_ph1 in the manner described below.

That is, the delay time estimation unit 117 calculates the longitudinal position delay time Td_px1 and the longitudinal speed delay time Td_vx1 corresponding to the acceleration included in the ego vehicle data input from the data reception unit 111 in accordance with the first map, to thereby estimate the longitudinal position delay time Td_px1 and the longitudinal speed delay time Td_vx1. This ego vehicle data is ego vehicle data corresponding to the object detection time associated with the object data D input from the data reception unit 111.

Similarly, when the sensor being the transmission source of the object data D input from the data reception unit 111 is the second sensor 102, the delay time estimation unit 117 uses the second map to estimate the longitudinal position delay time Td_px2 and the longitudinal speed delay time Td_vx2 included in the physical-quantity delay time group Td_ph2.

The delay time estimation unit 117 outputs to the correction unit 114 the estimated longitudinal position delay time Td_px1 and longitudinal speed delay time Td_vx1, and the sensor delay time set value Td_set1 being the fixed value determined in advance.

Similarly, the delay time estimation unit 117 outputs to the correction unit 114 the estimated longitudinal position delay time Td_px2 and longitudinal speed delay time Td_vx2, and the sensor delay time set value Td_set2 being the fixed value determined in advance.

The correction unit 114 obtains the object data D from the data reception unit 111, and obtains the prediction data P and the association possible region Sp from the prediction unit 112 as in the first embodiment when the configuration of the first embodiment is applied. Further, the correction unit 114 uses the physical-quantity delay time group Td_ph1 and the physical-quantity delay time group Td_ph2 estimated by the delay time estimation unit 117 to correct the association possible region Sp, to thereby generate the corrected association possible region Sp_mod. As a result, the longitudinal position delay time Td_px1 and the longitudinal position delay time Td_px2 estimated in consideration of the acceleration of the ego vehicle are used to be able to correct the association possible region Sp. The correction unit 114 is configured to further generate a corrected association possible region Sv_mod when the configuration of the second embodiment is applied as described below. That is, the correction unit 114 is configured to use the physical-quantity delay time group Td_ph1 and the physical-quantity delay time group Td_ph2 estimated by the delay time estimation unit 117 to further correct the association possible region Sv, to thereby generate the corrected association possible region Sv_mod.

In the third embodiment, there is exemplified the case in which the acceleration of the ego vehicle is used to estimate each of the physical-quantity delay time group Td_ph1 and the physical-quantity delay time group Td_ph2, but the configuration is not limited to this example. For example, when the physical-quantity delay time group Td_ph1 and the physical-quantity delay time group Td_ph2 change in accordance with a state other than the acceleration of the ego vehicle, this state may be used to estimate each of the physical-quantity delay time group Td_ph1 and the physical-quantity delay time group Td_ph2. As the state other than the acceleration of the ego vehicle, for example, the speed of the ego vehicle or the yaw rate of the ego vehicle is conceivable.

According to the third embodiment described above, the processing unit 110 of the object recognition device 100 is configured to estimate each of the plurality of physical-quantity delay time groups Td_ph1 and Td_ph2 based on the ego vehicle data compared with the configurations of the first and second embodiments. As a result, the same effects as those in the first and second embodiments are provided, and it is also possible to address the case in which each of the plurality of the physical-quantity delay time groups Td_ph1 and Td_ph2 changes in accordance with the states of the ego vehicle.

Fourth Embodiment

In a fourth embodiment of the present invention, description is given of an object recognition device 100 including the first sensor 101 and the second sensor 102 configured to transmit the physical-quantity delay time group Td_ph1 and the physical-quantity delay time group Td_ph2, respectively. In the fourth embodiment, the prediction unit 112 and the correction unit 114 are included in the setting unit 120. In the fourth embodiment, description of the same points as those in the first to third embodiments are omitted, and description is mainly given of points different from those in the first to third embodiments.

In the first and second embodiments, the processing unit 110 holds the physical-quantity delay time group Td_ph1 and the physical-quantity delay time group Td_ph2 determined in advance. In contrast, in the fourth embodiment, the processing unit 110 obtains the physical-quantity delay time group Td_ph1 and the physical-quantity delay time group Td_ph2 from the first sensor 101 and the second sensor 102, respectively.

Figure 19:
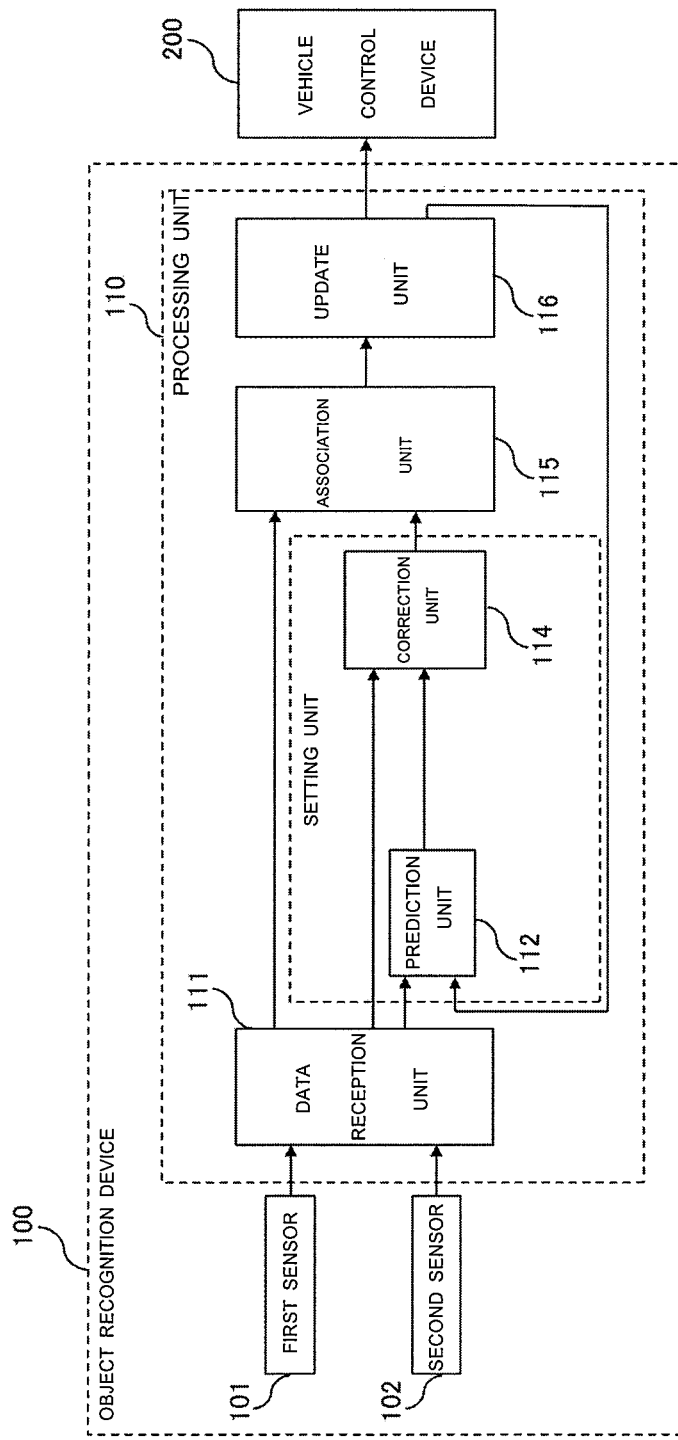
FIG. 19 is a block diagram for illustrating a configuration of a vehicle control system including an object recognition device according to a fourth embodiment of the present invention.

FIG. 19 is a block diagram for illustrating a configuration of a vehicle control system including the object recognition device 100 according to the fourth embodiment. In FIG. 19, the vehicle control system is installed in the ego vehicle, and includes the object recognition device 100 and the vehicle control device 200.

The object recognition device 100 includes the first sensor 101, the second sensor 102, and the processing unit 110.

The first sensor 101 holds in advance the physical-quantity delay time group Td_ph1 corresponding to the first sensor 101 itself. The first sensor 101 transmits the physical-quantity delay time group Td_ph1 along with the object data D to the processing unit 110.

The second sensor 102 holds in advance the physical-quantity delay time group Td_ph2 corresponding to the second sensor 102 itself. The second sensor 102 transmits the physical-quantity delay time group Td_ph2 along with the object data D to the processing unit 110.

The processing unit 110 includes the data reception unit 111, the prediction unit 112, the correction unit 114, the association unit 115, and the update unit 116.

The data reception unit 111 associates the object data D1 received from the first sensor 101 with the determined object detection time and outputs the associated object data D1 to the prediction unit 112, the correction unit 114, and the association unit 115 as in the first and second embodiments. Further, the data reception unit 111 outputs the physical-quantity delay time group Td_ph1 obtained from the first sensor 101 and the set sensor delay time set value Td_set1 to the correction unit 114.

The data reception unit 111 associates the object data D2 received from the second sensor 102 with the determined object detection time and outputs the associated object data D2 to the prediction unit 112, the correction unit 114, and the association unit 115 as in the first and second embodiments. Further, the data reception unit 111 outputs the physical-quantity delay time group Td_ph2 obtained from the second sensor 102 and the set sensor delay time set value Td_set2 to the correction unit 114.

The correction unit 114 obtains the object data D from the data reception unit 111 and obtains the prediction data P and the association possible region Sp from the prediction unit 112 as in the first embodiment when the configuration of the first embodiment is applied. Further, the correction unit 114 uses the physical-quantity delay time group Td_ph1 and the physical-quantity delay time group Td_ph2 transmitted from the first sensor 101 and the second sensor 102, respectively, to correct the association possible region Sp, to thereby generate the corrected association possible region Sp_mod. The correction unit 114 is configured to further generate the corrected association possible region Sv_mod when the configuration of the second embodiment is applied as described below. That is, the correction unit 114 is configured to use the physical-quantity delay time group Td_ph1 and the physical-quantity delay time group Td_ph2 transmitted from the first sensor 101 and the second sensor 102, respectively, to further correct the association possible region Sv, to thereby further generate the corrected association possible region Sv_mod.

As described above, the correction unit 114 is configured to use the physical-quantity delay time group Td_ph1 and the physical-quantity delay time group Td_ph2 obtained through the method different from that in the first embodiment to correct the association possible region Sp when the configuration of the first embodiment is applied. Moreover, the correction unit 114 is configured to use the physical-quantity delay time group Td_ph1 and the physical-quantity delay time group Td_ph2 obtained through the method different from that in the second embodiment to correct the association possible region Sp and the association possible region Sv when the configuration of the second embodiment is applied.

As described above, according to the fourth embodiment, the plurality of sensors 101 and 102 of the object recognition device 100 are configured to transmit the physical-quantity delay time groups Td_ph1 and Td_ph2 corresponding to the sensors 101 and 102, respectively, along with the object data D. Even in the case configured as described above, the same effects as those in the first and second embodiments are obtained.

Fifth Embodiment

In a fifth embodiment of the present invention, description is given of an object recognition device 100 including an ego vehicle travel scene obtaining unit 104 and a physical-quantity delay time estimation unit 118. In the fifth embodiment, the prediction unit 112 and the correction unit 114 are included in the setting unit 120. In the fifth embodiment, description of the same points as those in the first to fourth embodiments are omitted, and description is mainly given of points different from those in the first to fourth embodiments.

In the third embodiment described above, the data reception unit 111 receives the ego vehicle data from the ego vehicle sensor 103. In contrast, in the fifth embodiment, it is assumed that, when ego vehicle travel scene data corresponding to an ego vehicle travel scene is transmitted from the ego vehicle travel scene obtaining unit 104, the data reception unit 111 receives the ego vehicle travel scene data.

Figure 20:
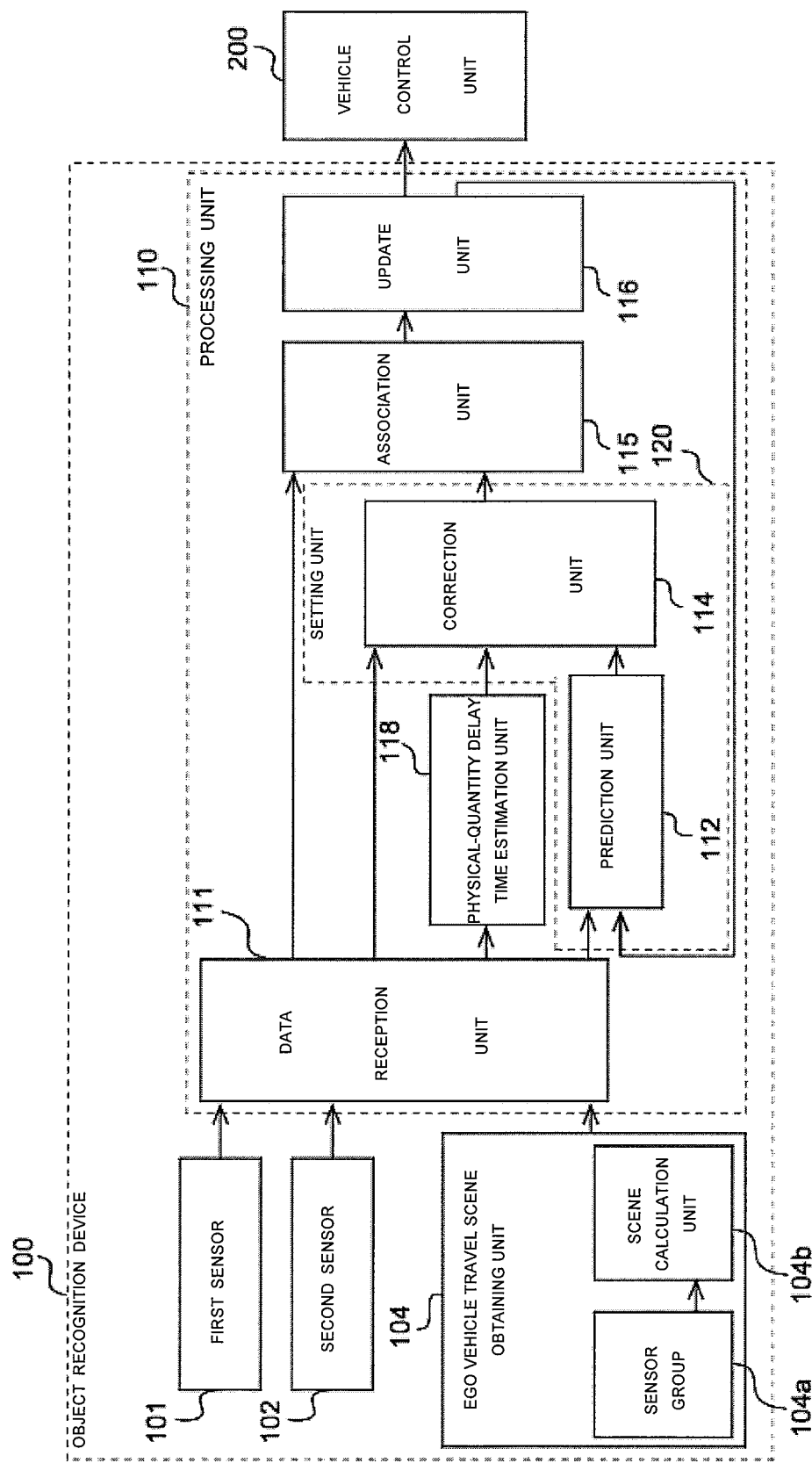
FIG. 20 is a block diagram for illustrating a configuration of a vehicle control system including an object recognition device according to a fifth embodiment of the present invention.

FIG. 20 is a block diagram for illustrating a configuration of a vehicle control system including the object recognition device 100 according to the fifth embodiment. In FIG. 20, the vehicle control system is installed in the ego vehicle, and includes the object recognition device 100 and the vehicle control device 200.

The object recognition device 100 includes the first sensor 101, the second sensor 102, the ego vehicle travel scene obtaining unit 104, and the processing unit 110.

The processing unit 110 includes the data reception unit 111, the prediction unit 112, the correction unit 114, the association unit 115, the update unit 116, and the physical-quantity delay time estimation unit 118.

The ego vehicle travel scene obtaining unit 104 includes a sensor group 104a and a scene calculation unit 104b. The sensor group 104a includes a laser sensor and an illuminance sensor. The scene calculation unit 104b obtains the ego vehicle travel scene based on detection results of the laser sensor and the illuminance sensor.

The laser sensor is mounted to, for example, a roof of the ego vehicle. As the laser sensor, for example, a light detection and ranging (LIDAR) sensor is mounted to the roof of the ego vehicle. The LIDAR sensor includes a plurality of light emitting units, one light receiving unit, and a calculation unit. The plurality of light emitting units are arranged so as to face forward in a travel direction of the ego vehicle at a plurality of angles with respect to a perpendicular direction of the ego vehicle.

A time of flight (TOF) type is employed for the LIDAR sensor. Specifically, the plurality of light emitting units of the LIDAR sensor have a function of radially emitting laser light while rotating in the horizontal direction during a light emitting time period set in advance. The light receiving unit of the LIDAR sensor has a function of receiving reflected light from an object during a light receiving time period set in advance. The calculation unit of the LIDAR sensor has a function of obtaining round-trip times each being a difference between a light emitting time in the plurality of light emitting units and a light receiving time in the light reception unit. The calculation unit of the LIDAR sensor has a function of obtaining the distances to the object based on the round-trip times.

The LIDAR sensor has a function of also measuring the direction to the object by obtaining the distances to the object. Thus, the position, the speed, and the direction of each of the objects present in the surroundings of the ego vehicle are observed based on the measurement results obtained by the LIDAR sensor.

The scene calculation unit 104b detects the number of targets to be tracked, the number of reflectors other than the targets among the objects present in the surroundings of the ego vehicle, and the like based on the position, the speed, and the direction of each of the objects present in the surroundings of the ego vehicle.

When the number of targets is larger than a target upper limit value, the scene calculation unit 104b detects the ego vehicle travel scene as a first scene. The scene calculation unit 104b transmits the first scene as the ego vehicle travel scene data to the data reception unit 111.

When the number of reflectors other than the targets is larger than a non-target upper limit value, the scene calculation unit 104b detects the ego vehicle travel scene as a second scene. The scene calculation unit 104b transmits the second scene as the ego vehicle travel scene data to the data reception unit 111.

Meanwhile, the illuminance sensor is mounted to a front windshield, an inner rear-view mirror, a dashboard, or the like. The illuminance sensor is formed of, for example, a circuit including a photo IC diode. The illuminance sensor detects a light amount in the surroundings of the ego vehicle.

When the illuminance detected by the illuminance sensor is lower than an illuminance threshold value, the scene calculation unit 104b detects the ego vehicle travel scene as a third scene. The scene calculation unit 104b transmits the third scene as the ego vehicle travel scene data to the data reception unit 111.

In other words, the ego vehicle travel scene obtaining unit 104 obtains the current ego vehicle travel scene in the vehicle in which the object recognition device 100 is installed. The ego vehicle travel scene obtaining unit 104 transmits the ego vehicle travel scene data corresponding to the ego vehicle travel scene to the data reception unit 111.

When an in-vehicle camera is installed in the ego vehicle, the function of the illuminance sensor may be substituted by the in-vehicle camera.

In this case, the scene calculation unit 104b is only required to derive the illuminance in the surroundings of the ego vehicle based on an illuminance value included in a taken image obtained by the in-vehicle camera.

When the object data is transmitted from the first sensor 101 or the second sensor 102, the data reception unit 111 receives the object data. When the ego vehicle travel scene data is transmitted from the ego vehicle travel scene obtaining unit 104, the data reception unit 111 receives the ego vehicle travel scene data. The data reception unit 111 transmits the ego vehicle travel scene data to the physical-quantity delay time estimation unit 118. An order of the reception of one of the object data or the ego vehicle travel scene data by the data reception unit 111 is not particularly limited.

When the ego vehicle travel scene is the first scene, all of the first sensor 101 and the second sensor 102 are to be influenced. Specifically, a detection error of each of the first sensor 101 and the second sensor 102 does not increase, but a period of time required for the detection processing increases as the number of targets increases. Thus, only the physical-quantity delay times of each of the first sensor 101 and the second sensor 102 increase.

To deal with this problem, the physical-quantity delay time estimation unit 118 increases the longitudinal position delay time Td_px1 and the longitudinal speed delay time Td_vx1 as the number of targets increases.

Specifically, the physical-quantity delay time estimation unit 118 holds in advance a first correction map I associating the first scene, the number of targets, the longitudinal position delay time Td_px1, and the longitudinal speed delay time Td_vx1 with one another. The first correction map I is obtained through an experiment for verifying, in advance, what values the longitudinal position delay time Td_px1 and the longitudinal speed delay time Td_vx1 take in accordance with the number of targets included in driving test data obtained in advance.

Similarly, the physical-quantity delay time estimation unit 118 holds in advance a second correction map I associating the first scene, the number of targets, the longitudinal position delay time Td_px2, and the longitudinal speed delay time Td_vx2 with one another. The second correction map I is obtained through an experiment for verifying, in advance, what values the longitudinal position delay time Td_px2 and the longitudinal speed delay time Td_vx2 take in accordance with the number of targets included in driving test data obtained in advance.

When the sensor being the transmission source of the object data D input from the data reception unit 111 is the first sensor 101 and the ego vehicle travel scene is the first scene, the physical-quantity delay time estimation unit 118 uses the first correction map I to estimate the longitudinal position delay time Td_px1 and the longitudinal speed delay time Td_vx1.

Similarly, when the sensor being the transmission source of the object data D input from the data reception unit 111 is the second sensor 102 and the ego vehicle travel scene is the first scene, the physical-quantity delay time estimation unit 118 uses the second correction map I to estimate the longitudinal position delay time Td_px2 and the longitudinal speed delay time Td_vx2.

The physical-quantity delay time estimation unit 118 outputs to the correction unit 114 the estimated longitudinal position delay time Td_px1 and longitudinal speed delay time Td_vx1, and the sensor delay time set value Td_set1 being the fixed value determined in advance.

Similarly, the physical-quantity delay time estimation unit 118 outputs to the correction unit 114 the estimated longitudinal position delay time Td_px2 and longitudinal speed delay time Td_vx2, and the sensor delay time set value Td_set2 being the fixed value determined in advance.

The correction unit 114 does not increase the size of the association possible region Sp and corrects only the center point Cp of the association possible region Sp. The correction unit 114 uses Expression (1-1) to Expression (1-5) to calculate the correction amount Mp based on the prediction data P and the physical-quantity delay times in the manner described above. As apparent from Expression (1-1) to Expression (1-5), the correction amount Mp increases as the longitudinal position delay time Td_px1 being the physical-quantity delay time increases.

That is, as the number of targets increases, the correction amount Mp increases.

The correction unit 114 calculates the corrected center point Cp_mod being the center point of the corrected association possible region Sp_mod in accordance with Expression (1-6). As apparent from Expression (1-6), as the correction amount Mp increases, the corrected center point Cp_mod becomes more apart from the center point Cp of the association possible region Sp.

When the ego vehicle travel scene is the second scene, one of the first sensor 101 and the second sensor 102 corresponding to a radar is to be influenced. Specifically, the radar is to be influenced by reflection by a reflector other than the target. Thus, detection errors in distance, speed, and angle in the radar increase.

In order to suppress the detection errors, a degree of smoothness of a low-pass filter in the radar is only required to be increased. As a result, high-frequency noise included in a detection result of the radar is suppressed. However, the physical-quantity delay times increase.

To deal with this problem, the physical-quantity delay time estimation unit 118 increases the physical-quantity delay times as the number of reflectors other than the targets increases.

Specifically, the physical-quantity delay time estimation unit 118 holds in advance a third correction map II associating the second scene, the number of reflectors other than the targets, the longitudinal position delay time Td_px1, and the longitudinal speed delay time Td_vx1 with one another. The third correction map II is obtained through an experiment for verifying, in advance, what values the longitudinal position delay time Td_px1 and the longitudinal speed delay time Td_vx1 take in accordance with the number of reflectors other than the targets included in driving test data obtained in advance.

Similarly, the physical-quantity delay time estimation unit 118 holds in advance a fourth correction map II associating the second scene, the number of reflectors other than the targets, the longitudinal position delay time Td_px2, and the longitudinal speed delay time Td_vx2 with one another. The fourth correction map II is obtained through an experiment for verifying, in advance, what values the longitudinal position delay time Td_px2 and the longitudinal speed delay time Td_vx2 take in accordance with the number of reflectors other than the targets included in driving test data obtained in advance.

The physical-quantity delay time estimation unit 118 uses the third correction map II to estimate the longitudinal position delay time Td_px1 and the longitudinal speed delay time Td_vx1 when the sensor being the transmission source of the object data D input from the data reception unit 111 is the first sensor 101 and the ego vehicle travel scene is the second scene.

Similarly, the physical-quantity delay time estimation unit 118 uses the fourth correction map II to estimate the longitudinal position delay time Td_px2 and the longitudinal speed delay time Td_vx2 when the sensor being the transmission source of the object data D input from the data reception unit 111 is the second sensor 102 and the ego vehicle travel scene is the second scene.

The physical-quantity delay time estimation unit 118 outputs to the correction unit 114 the estimated longitudinal position delay time Td_px1 and longitudinal speed delay time Td_vx1, and the sensor delay time set value Td_set1 being the fixed value determined in advance.

Similarly, the physical-quantity delay time estimation unit 118 outputs to the correction unit 114 the estimated longitudinal position delay time Td_px2 and longitudinal speed delay time Td_vx2, and the sensor delay time set value Td_set2 being the fixed value determined in advance.

The correction unit 114 increases the size of the association possible region Sp. The correction unit 114 uses Expression (1-1) to Expression (1-5) to calculate the correction amount Mp based on the prediction data P and the physical-quantity delay times in the manner described above. As apparent from Expression (1-1) to Expression (1-5), the correction amount Mp increases as the longitudinal position delay time Td_px1 being the physical-quantity delay time increases.

That is, as the number of reflectors other than the targets increases, the correction amount Mp increases.

The correction unit 114 calculates the corrected longitudinal width Wp_mod in accordance with Expression (1-7). As apparent from Expression (1-7), as the correction amount Mp increases, the corrected longitudinal width Wp_mod increases. Thus, the size of the association possible region Sp increases.

When the ego vehicle travel scene is the second scene, the correction unit 114 may not only increase the size of the association possible region Sp but also correct the center point Cp of the association possible region Sp. The correction unit 114 calculates the corrected center point Cp_mod and the corrected longitudinal width Wp_mod in accordance with Expression (1-8). As apparent from Expression (1-8), as the correction amount Mp increases, the corrected center point Cp_mod becomes more apart from the center point Cp of the association possible region Sp, and the corrected longitudinal width Wp_mod increases.

When the ego vehicle travel scene is the third scene, one of the first sensor 101 and the second sensor 102 corresponding to an optical camera is to be influenced. Specifically, the optical camera is influenced by the brightness of the surroundings such as the brightness of the day, the brightness of the night, the brightness of an inside of a tunnel, and the brightness of an outside of the tunnel. For example, in a case in which the surroundings of the ego vehicle are dark, the optical camera cannot accurately detect a contour of the target compared with a case in which the surroundings of the ego vehicle are bright. As a result, detection errors in the longitudinal position and a lateral position become larger in the optical camera.

In order to suppress the detection errors, a degree of smoothness of a low-pass filter in the optical camera is only required to be increased. As a result, high-frequency noise included in a detection result of the optical camera is suppressed. However, the physical-quantity delay times increase.

To deal with this problem, the physical-quantity delay time estimation unit 118 increases the physical-quantity delay times as the surroundings of the ego vehicle become darker.

Specifically, the physical-quantity delay time estimation unit 118 holds in advance a fifth correction map III associating the third scene, the illuminance, the longitudinal position delay time Td_px1, and the longitudinal speed delay time Td_vx1 with one another. The fifth correction map III is obtained through an experiment for verifying, in advance, what values the longitudinal position delay time Td_px1 and the longitudinal speed delay time Td_vx1 take in accordance with a light amount included in driving test data obtained in advance.

Similarly, the physical-quantity delay time estimation unit 118 holds in advance a sixth correction map III associating the third scene, the illuminance, the longitudinal position delay time Td_px2, and the longitudinal speed delay time Td_vx2 with one another. The sixth correction map III is obtained through an experiment for verifying, in advance, what values the longitudinal position delay time Td_px2 and the longitudinal speed delay time Td_vx2 take in accordance with a light amount included in driving test data obtained in advance.

The physical-quantity delay time estimation unit 118 uses the fifth correction map III to estimate the longitudinal position delay time Td_px1 and the longitudinal speed delay time Td_vx1 when the sensor being the transmission source of the object data D input from the data reception unit 111 is the first sensor 101 and the ego vehicle travel scene is the third scene.

Similarly, the physical-quantity delay time estimation unit 118 uses the sixth correction map III to estimate the longitudinal position delay time Td_px2 and the longitudinal speed delay time Td_vx2 when the sensor being the transmission source of the object data D input from the data reception unit 111 is the second sensor 102 and the ego vehicle travel scene is the third scene.

The physical-quantity delay time estimation unit 118 outputs to the correction unit 114 the estimated longitudinal position delay time Td_px1 and longitudinal speed delay time Td_vx1, and the sensor delay time set value Td_set1 being the fixed value determined in advance.

Similarly, the physical-quantity delay time estimation unit 118 outputs to the correction unit 114 the estimated longitudinal position delay time Td_px2 and longitudinal speed delay time Td_vx2, and the sensor delay time set value Td_set2 being the fixed value determined in advance.

The correction unit 114 increases the size of the association possible region Sp. The correction unit 114 uses Expression (1-1) to Expression (1-5) to calculate the correction amount Mp based on the prediction data P and the physical-quantity delay times as described above. As apparent from Expression (1-1) to Expression (1-5), the correction amount Mp increases as the longitudinal position delay time Td_px1 being the physical-quantity delay time increases.

That is, as the surroundings of the ego vehicle become darker, the correction amount Mp increases. As apparent from Expression (1-7), as the correction amount Mp increases, the corrected longitudinal width Wp_mod increases. Thus, the size of the association possible region Sp increases.

The correction unit 114 calculates the corrected longitudinal width Wp_mod in accordance with Expression (1-7).

When the ego vehicle travel scene is the third scene, the correction unit 114 may not only increase the size of the association possible region Sp but also correct the center point Cp of the association possible region Sp. The correction unit 114 calculates the corrected center point Cp_mod and the corrected longitudinal width Wp_mod in accordance with Expression (1-8). As apparent from Expression (1-8), as the correction amount Mp increases, the corrected center point Cp_mod becomes more apart from the center point Cp of the association possible region Sp, and the corrected longitudinal width Wp_mod increases.

As described above, the correction unit 114 sets the association possible region Sp based on the prediction data P and the physical-quantity delay times.

An exact value not present in the first correction map I, the second correction map I, the third correction map II, the fourth correction map II, the fifth correction map III, or the sixth correction map III is only required to appropriately be derived through interpolation or extrapolation.

Description is now given of a control example of the object recognition device 100 according to the fifth embodiment.

Figure 21:
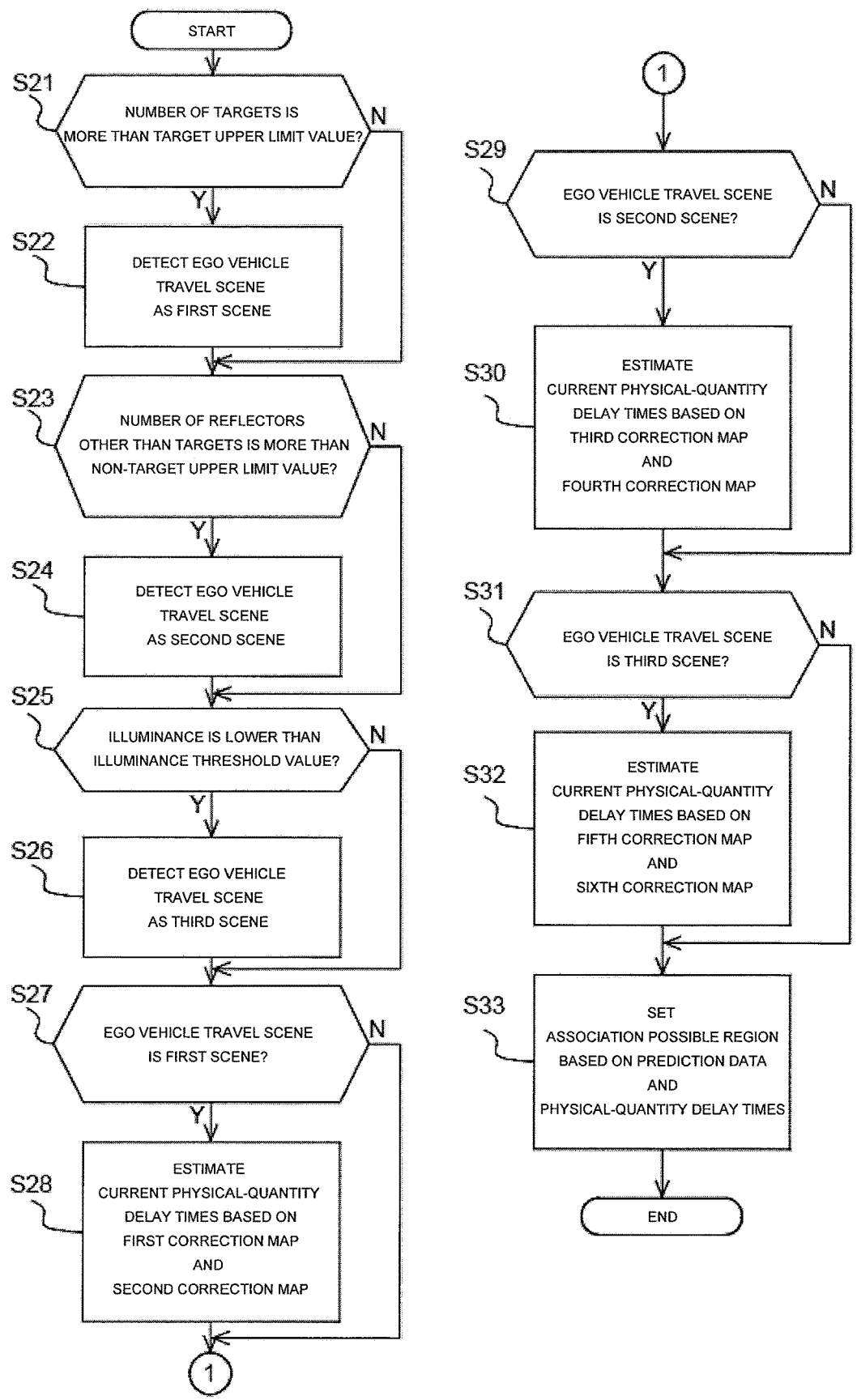
FIG. 21 is a flowchart for illustrating a control example of the object recognition device according to the fifth embodiment.

FIG. 21 is a flowchart for illustrating the control example of the object recognition device 100 according to the fifth embodiment.

In Step S21, the ego vehicle travel scene obtaining unit 104 determines whether or not the number of targets is larger than the target upper limit value. When the ego vehicle travel scene obtaining unit 104 determines that the number of targets is larger than the target upper limit, the processing of Step S21 proceeds to processing of Step S22.

In Step S22, the ego vehicle travel scene obtaining unit 104 detects the ego vehicle travel scene as the first scene. After that, the processing of Step S22 proceeds to processing of Step S23.

Meanwhile, when the ego vehicle travel scene obtaining unit 104 determines in Step S21 that the number of targets is not larger than the target upper limit, the processing of Step S21 proceeds to processing of Step S23.

In Step S23, the ego vehicle travel scene obtaining unit 104 determines whether or not the number of reflectors other than the targets is larger than the non-target upper limit value. When the ego vehicle travel scene obtaining unit 104 determines that the number of reflectors other than the targets is larger than the non-target upper limit value, the processing of Step S23 proceeds to processing of Step S24.

In Step S24, the ego vehicle travel scene obtaining unit 104 detects the ego vehicle travel scene as the second scene. After that, the processing of Step S24 proceeds to processing of Step S25.

Meanwhile, when the ego vehicle travel scene obtaining unit 104 determines in Step S23 that the number of reflectors other than the targets is not larger than the non-target upper limit value, the processing of Step S23 proceeds to processing of Step S25.

In Step S25, the ego vehicle travel scene obtaining unit 104 determines whether or not the illuminance is lower than the illuminance threshold value. When the ego vehicle travel scene obtaining unit 104 determines that the illuminance is lower than the illuminance threshold value, the processing of Step S25 proceeds to processing of Step S26.

In Step S26, the ego vehicle travel scene obtaining unit 104 detects the ego vehicle travel scene as the third scene. After that, the processing of Step S26 proceeds to processing of Step S27.

Meanwhile, when the ego vehicle travel scene obtaining unit 104 determines in Step S25 that the illuminance is not lower than the illuminance threshold value, that is, when the ego vehicle travel scene obtaining unit 104 determines that the illuminance is equal to or higher than the illuminance threshold value, the processing of Step S25 proceeds to processing of Step S27.

In Step S27, the physical-quantity delay time estimation unit 118 determines whether or not the ego vehicle travel scene is the first scene. When the physical-quantity delay time estimation unit 118 determines that the ego vehicle travel scene is the first scene, the processing of Step S27 proceeds to processing of Step S28.

In Step S28, the physical-quantity delay time estimation unit 118 estimates the current physical quantity estimation times based on the first correction map I and the second correction map I. After that, the processing of Step S28 proceeds to processing of Step S29.

Meanwhile, when the physical-quantity delay time estimation unit 118 determines in Step S27 that the ego vehicle travel scene is not the first scene, the processing of Step S27 proceeds to processing of Step S29.

In Step S29, the physical-quantity delay time estimation unit 118 determines whether or not the ego vehicle travel scene is the second scene. When the physical-quantity delay time estimation unit 118 determines that the ego vehicle travel scene is the second scene, the processing of Step S29 proceeds to processing of Step S30.

In Step S30, the physical-quantity delay time estimation unit 118 estimates the current physical quantity estimation times based on the third correction map II and the fourth correction map II. After that, the processing of Step S30 proceeds to processing of Step S31.

Meanwhile, when the physical-quantity delay time estimation unit 118 determines in Step S29 that the ego vehicle travel scene is not the second scene, the processing of Step S29 proceeds to processing of Step S31.

In Step S31, the physical-quantity delay time estimation unit 118 determines whether or not the ego vehicle travel scene is the third scene. When the physical-quantity delay time estimation unit 118 determines that the ego vehicle travel scene is the third scene, the processing of Step S31 proceeds to processing of Step S32.

In Step S32, the physical-quantity delay time estimation unit 118 estimates the current physical quantity estimation times based on the fifth correction map III and the sixth correction map III. After that, the processing of Step S32 proceeds to processing of Step S33.

Meanwhile, when the physical-quantity delay time estimation unit 118 determines in Step S31 that the ego vehicle travel scene is not the third scene, the processing of Step S31 proceeds to processing of Step S33.

In Step S33, the correction unit 114 sets the association possible region Sp based on the prediction data P generated by the prediction unit 112 and the physical-quantity delay times estimated by the physical-quantity delay time estimation unit 118. Then, the processing of Step S33 does not proceed to other processing, and is thus finished.

According to the fifth embodiment described above, the ego vehicle travel scene obtaining unit 104 detects the current ego vehicle travel scene. The ego vehicle travel scene obtaining unit 104 transmits the ego vehicle travel scene data corresponding to the ego vehicle travel scene to the data reception unit 111.

When the ego vehicle travel scene data is transmitted from the ego vehicle travel scene obtaining unit 104, the data reception unit 111 receives the ego vehicle travel scene data.

The physical-quantity delay time estimation unit 118 estimates at least one of the plurality of physical-quantity delay times each corresponding to each of the plurality of physical quantities included in the object data D based on the ego vehicle travel scene data received by the data reception unit 111.

The setting unit 120 generates the prediction data P which predicts the current object data D based on at least a part of the past object data D received by the data reception unit 111 and the motion model in the object. The setting unit 120 sets the association possible regions for determining the association between the prediction data P and the current object data D based on the prediction data P and the plurality of physical-quantity delay times.

With the above-mentioned configuration, the association possible region Sp can be set based on at least one of the physical-quantity delay times or the detection error of the sensor. Thus, it is possible to suppress the deterioration of the precision of the recognition of the object.

Moreover, the physical-quantity delay time estimation unit 118 estimates the plurality of current physical-quantity delay times based on the scenes stored in advance, the plurality of physical-quantity delay times stored in advance based on the scenes, and the current ego vehicle travel scene.

With the above-mentioned configuration, complicated calculations are not required in order to estimate the plurality of current physical-quantity delay times. Thus, the period of time required for the calculations can be reduced.

In the first to fifth embodiments, there is exemplified the case in which the object recognition device 100 is applied to the mode in which the plurality of physical quantities include the longitudinal position px of the object and the longitudinal speed vx of the object, but the mode is not limited to this example. That is, the object recognition device 100 can also be applied to a mode in which the plurality of physical quantities include a lateral position of the object and a lateral speed of the object in place of the longitudinal position px and the longitudinal speed vx. Moreover, it is expected that the object recognition device 100 also be applied to a mode in which the plurality of physical quantities include two of the longitudinal acceleration of the object, the lateral acceleration of the object, the angle of the object, the angular velocity of the object, and the distance from the ego vehicle to the object.

Each of the functions of the processing unit 110 of the object recognition device 100 according to each of the first to fifth embodiments described above is implemented by a processing circuit. The processing circuit for implementing each of the functions may be dedicated hardware, or a processor configured to execute a program stored in a memory. The functions of the vehicle control device 200 are also similarly implemented by a processing circuit.

When the processing circuit is dedicated hardware, the processing circuit corresponds to, for example, a single circuit, a composite circuit, a programmed processor, a parallel-programmed processor, an application specific integrated circuit (ASIC), a field programmable gate array (FPGA), or a combination thereof. The functions of the data reception unit 111, the prediction unit 112, the correction unit 114, the association unit 115, the update unit 116, the delay time estimation unit 117, the scene calculation unit 104b, the physical-quantity delay time estimation unit 118, and the setting unit 120 may each be implemented by an individual processing circuit, or may be implemented together by one processing circuit.

Meanwhile, when the processing circuit is a processor, the function of each of the data reception unit 111, the prediction unit 112, the correction unit 114, the association unit 115, the update unit 116, the delay time estimation unit 117, the scene calculation unit 104b, the physical-quantity delay time estimation unit 118, and the setting unit 120 is implemented by software, firmware, or a combination of software and firmware. The software and the firmware are coded as a program and stored in a memory. The processor reads out and executes the program stored in the memory, to thereby implement the function of each of the units. This means that the object recognition device 100 includes a memory for storing a program that consequently causes a data reception step, a prediction step, a correction step, a association step, an update step, and a delay time estimation step to be executed.

It is also understood that those programs cause a computer to execute procedures or methods for the respective units. In this case, the memory corresponds to, for example, a random access memory (RAM), a read only memory (ROM), a flash memory, an erasable programmable read only memory (EPROM), an electrically erasable and programmable read only memory (EEPROM), or other such non-volatile or volatile semiconductor memory. The memory also corresponds to, for example, a magnetic disk, a flexible disk, an optical disc, a compact disc, a MiniDisk, or a DVD.

Some of the functions of the respective units described above may be implemented by dedicated hardware, and other thereof may be implemented by software or firmware.

In this manner, the processing circuit can implement the function of each of the units described above by hardware, software, firmware, or a combination thereof.

What is claimed is:

1. An object recognition device, comprising:
   at least one sensor configured to detect an object present in a detectable range and to transmit object data including a plurality of physical quantities indicating a state of the object;
   a data reception unit configured to receive the object data from the at least one sensor; and
   a setting unit configured to generate prediction data which predicts current object data based on at least a part of past object data received by the data reception unit and a motion model in the object and to set a association possible region for determining a association between the prediction data and the current object data based on the prediction data and a plurality of physical-quantity delay times each corresponding to each of the plurality of physical quantities.

2. The object recognition device according to claim 1, wherein the plurality of physical-quantity delay times are fixed values determined in advance.

3. The object recognition device according to claim 1, wherein the at least one sensor is configured to transmit, along with the object data, the plurality of physical-quantity delay times corresponding to the at least one sensor.

4. The object recognition device according to claim 1, wherein the plurality of physical quantities include a longitudinal position and a longitudinal speed in the object.

5. The object recognition device according to claim 1, wherein the plurality of physical quantities include a lateral position and a lateral speed in the object.

6. The object recognition device according to claim 1, wherein the setting unit is configured to correct a center point of the association possible region, to thereby set the association possible region.

7. The object recognition device according to claim 1, wherein the setting unit is configured to correct a size of the association possible region, to thereby set the association possible region.

8. The object recognition device according to claim 1, wherein the setting unit is configured to correct a center point of the association possible region and a size of the association possible region, to thereby set the association possible region.

9. An object recognition device, comprising:
   at least one sensor configured to detect an object present in a detectable range and to transmit object data including a plurality of physical quantities indicating a state of the object;
   an ego vehicle travel scene obtaining unit configured to detect a current ego vehicle travel scene in a vehicle in which the object recognition device is installed and to transmit ego vehicle travel scene data corresponding to the current ego vehicle travel scene;
   a data reception unit configured to receive the object data when the object data is transmitted from the at least one sensor and to receive the ego vehicle travel scene data when the ego vehicle travel scene data is transmitted from the ego vehicle travel scene obtaining unit;
   a physical-quantity delay time estimation unit configured to estimate, based on the ego vehicle travel scene data, at least one of a plurality of physical-quantity delay times each corresponding to each of the plurality of physical quantities included in the object data; and
   a setting unit configured to generate prediction data which predicts current object data based on at least a part of past object data received by the data reception unit and a motion model in the object and to set a association possible region for determining a association between the prediction data and the current object data based on the prediction data and the plurality of physical-quantity delay times.

10. The object recognition device according to claim 9, wherein the physical-quantity delay time estimation unit is configured to estimate a plurality of current physical-quantity delay times based on scenes stored in advance, a plurality of physical-quantity delay times stored in advance based on the scenes, and the current ego vehicle travel scene.

11. An object recognition method, comprising:

at least one step of detecting an object present in a detectable range and transmitting object data including a plurality of physical quantities indicating a state of the object;

a step of receiving the object data transmitted in the at least one step of transmitting object data; and a step of generating prediction data which predicts current object data based on at least a part of past object data received in the step of receiving the object data and a motion model in the object and setting a association possible region for determining a association between the prediction data and the current object data based on a plurality of physical-quantity delay times each corresponding to each of the plurality of physical quantities included in the prediction data.

* * * * *